United States Patent [19]

Driscoll, Jr. et al.

[11] Patent Number: 5,067,162
[45] Date of Patent: Nov. 19, 1991

[54] METHOD AND APPARATUS FOR VERIFYING IDENTITY USING IMAGE CORRELATION

[75] Inventors: Edward C. Driscoll, Jr., Portola Valley; Craig O. Martin, Menlo Park, both of Calif.; Kenneth Ruby, Florence, Oreg.; James J. Russell, Mountain View; John G. Watson, Menlo Park, both of Calif.

[73] Assignee: Identix Incorporated, Sunnyvale, Calif.

[21] Appl. No.: 879,987

[22] Filed: Jun. 30, 1986

[51] Int. Cl.$^5$ .............................................. G06K 9/62
[52] U.S. Cl. ......................................... 382/5; 382/30; 382/34
[58] Field of Search ..................... 382/4, 5, 21, 8, 30, 382/34

[56] References Cited

U.S. PATENT DOCUMENTS

| | | | |
|---|---|---|---|
| 3,898,617 | 8/1975 | Kashioka et al. | 382/8 |
| 3,944,978 | 3/1676 | Jensen et al. | 340/146.3 |
| 4,053,228 | 10/1177 | Schiller | 356/71 |
| 4,135,147 | 1/1979 | Riganati et al. | 382/5 |
| 4,185,270 | 1/1980 | Fischer et al. | 340/146.3 |
| 4,210,899 | 7/1980 | Swonger et al. | 340/146.3 E |
| 4,227,805 | 10/1980 | Schiller | 356/71 |
| 4,246,568 | 1/1981 | Peterson | 340/146.3 E |
| 4,322,163 | 3/1982 | Schiller | 356/71 |
| 4,334,241 | 6/1982 | Kashioka et al. | 358/107 |
| 4,441,205 | 4/1984 | Berkin et al. | 382/8 |
| 4,537,484 | 8/1985 | Fowler et al. | 354/62 |
| 4,544,267 | 10/1985 | Schiller | 356/71 |
| 4,553,837 | 11/1985 | MArcus | 356/71 |
| 4,569,080 | 2/1986 | Schiller | 382/4 |
| 4,581,760 | 4/1986 | Schiller et al. | 382/4 |
| 4,599,656 | 7/1986 | Bellinghausen | 358/261 |
| 4,685,145 | 8/1987 | Schiller | 382/5 |
| 4,783,831 | 11/1988 | Kashioka et al. | 382/34 |

FOREIGN PATENT DOCUMENTS 83102997 10/1983 European Pat. Off. .
85108402 1/1986 European Pat. Off. .

OTHER PUBLICATIONS

Schiller, "Fingerprint Identification System", Fingermatrix Inc., Published EPA #0090377, 10/5/83.
S. Kashioka et al., "Automatic Template Selection Technique for the Local Pattern Matching Method", Systems & Computer in Japan, vol. 17, No. 5, 1986; pp. 25-35.
M. Schiller et al., "Fingerprint Verification Method", EPA 0 125 532; Ser. No. 84104529.7 filed Apr. 21, 1984.
A. Shimizu, "Fingerprint Collator", Ser. No. 58-123186.
Y. M. Ting et al., "Fingerprint Image Enhancement System", IBM Technical Disclosure Bulletin, vol. 16, No. 8, Jan. 1974.

Primary Examiner—Leo H. Boudreau
Attorney, Agent, or Firm—Limbach, Limbach & Sutton

[57] ABSTRACT

A method and apparatus for verification of personnel identity by correlation of fingerprint images. The method includes the steps of: first enrolling a person by the steps of forming a reference image of a fingerprint of the person, identifying a plurality of reference sections within the reference image, where the image data contained in each of the reference sections is distinct relative to the image data adjacent to and surrounding the reference section, and saving the image data of each of the reference sections; and then verifying the identity of someone claiming to be an enrolled person by the steps of retrieving the image data of the reference sections of the enrolled person, forming a verify image of the fingerprint of the person claiming to be enrolled, where the verify image includes a plurality of verify regions each corresponding in position to one of the reference sections and each larger in extent than its corresponding reference section, determining a best-match location within each verify region at which the image data is most similar to the image data of its corresponding reference section, and verifying the identity of the person claiming to be enrolled according to the degree of similarity between the image data of the best-match locations and the corresponding reference sections and according to the degree of similarity between the relative positioning of the best-match locations and the corresponding reference sections.

48 Claims, 12 Drawing Sheets

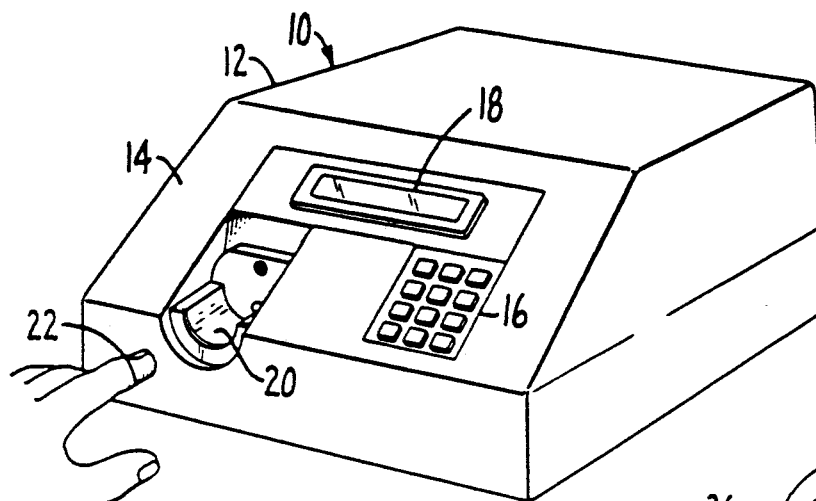
(PRIOR ART)
FIG. 1
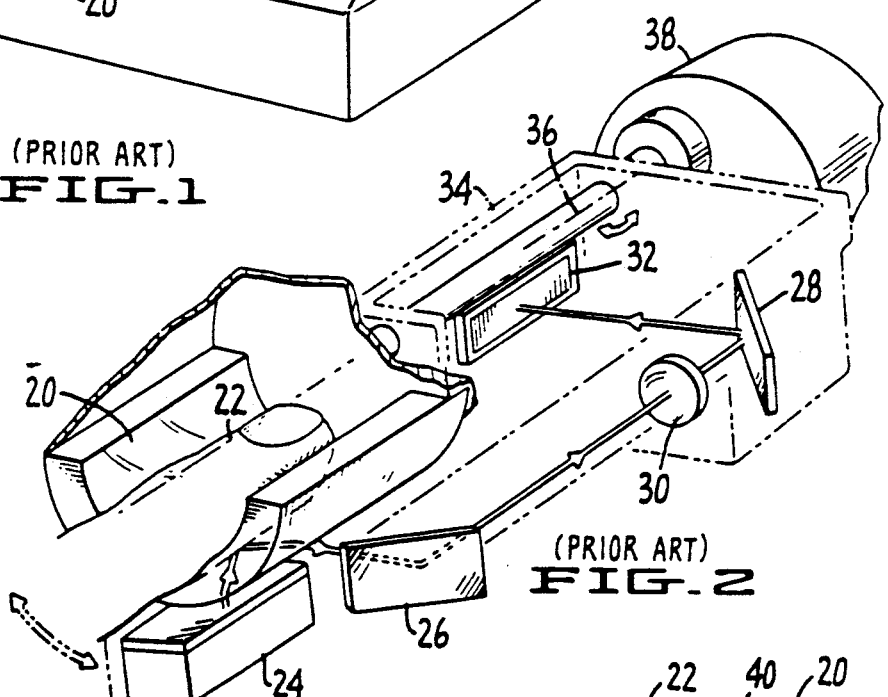
(PRIOR ART)
FIG. 2
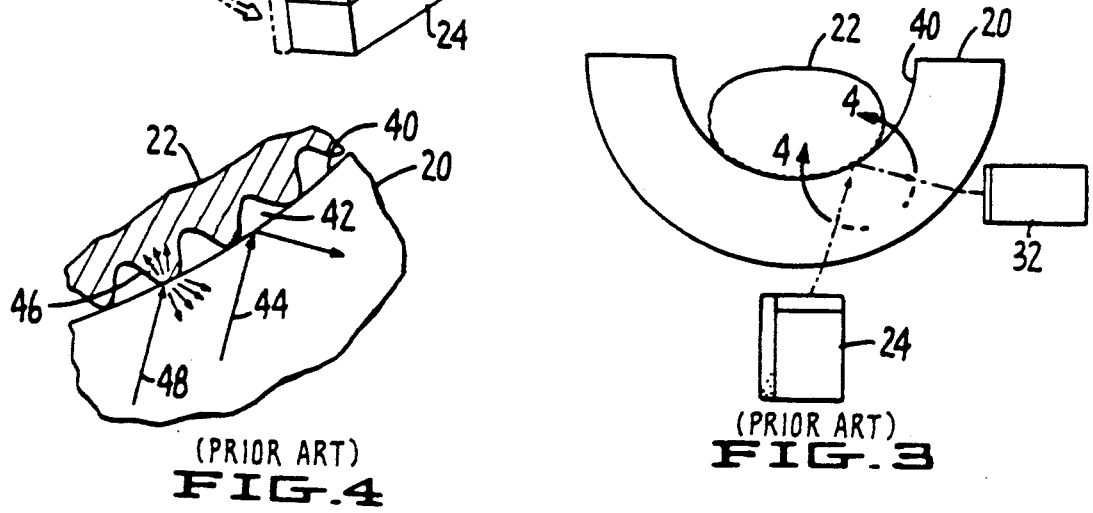
(PRIOR ART)
FIG. 4
(PRIOR ART)
FIG. 3

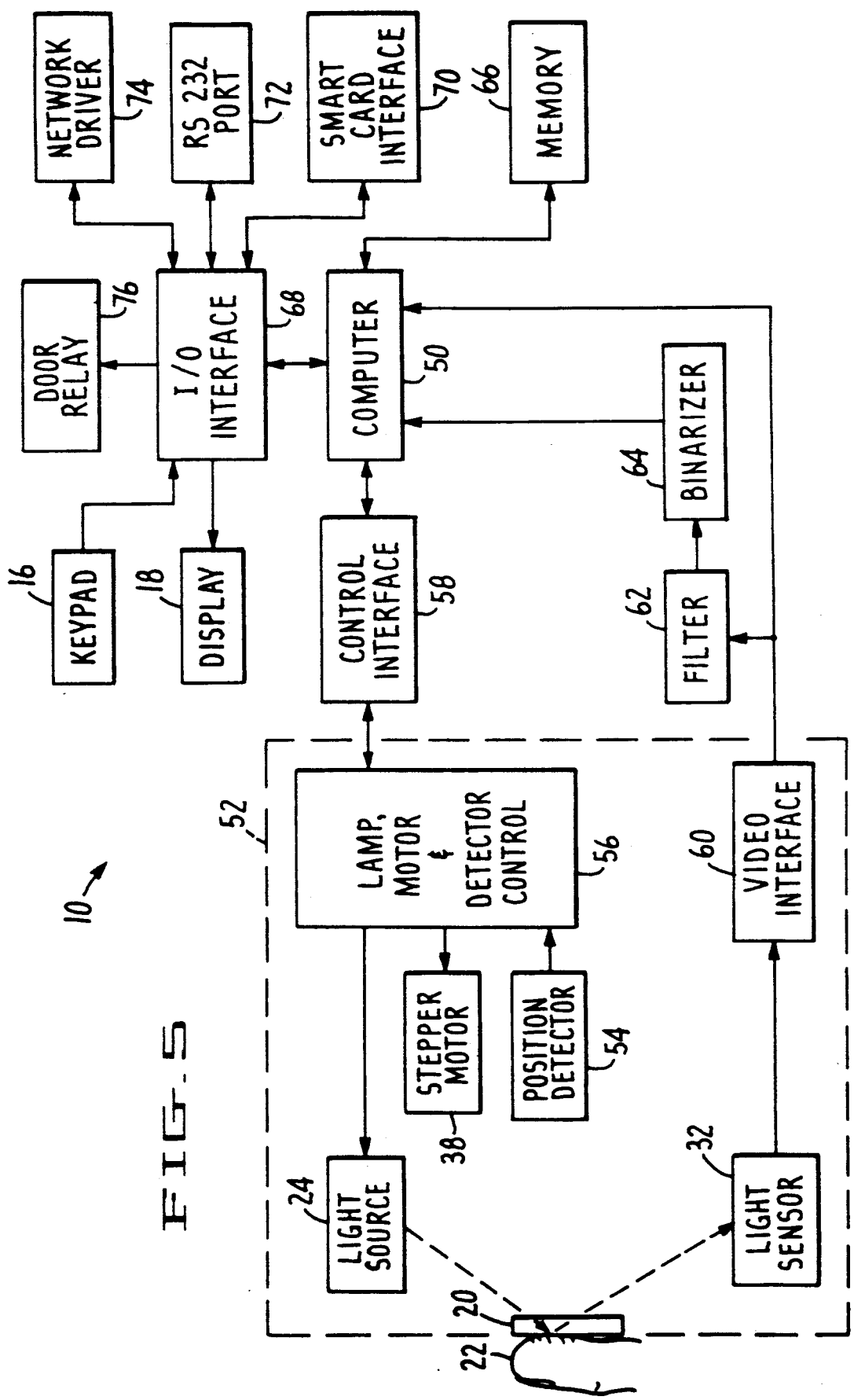

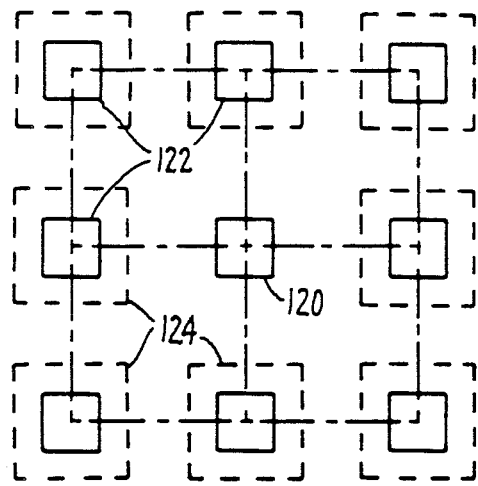
FIG_16A.
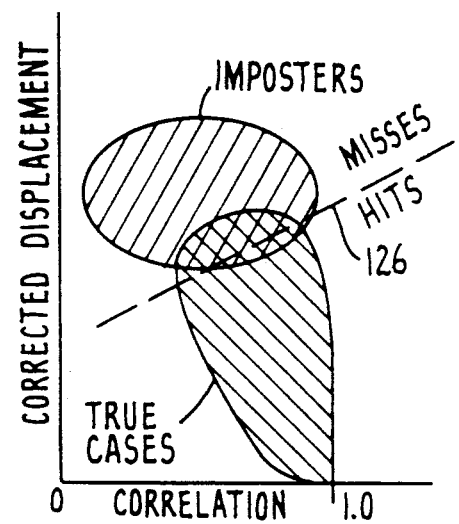
FIG_17.
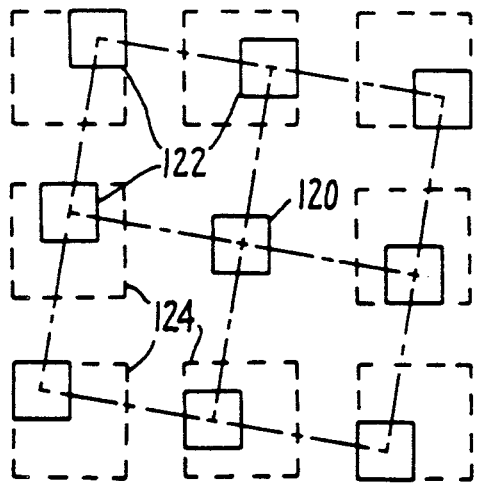
FIG_16B.
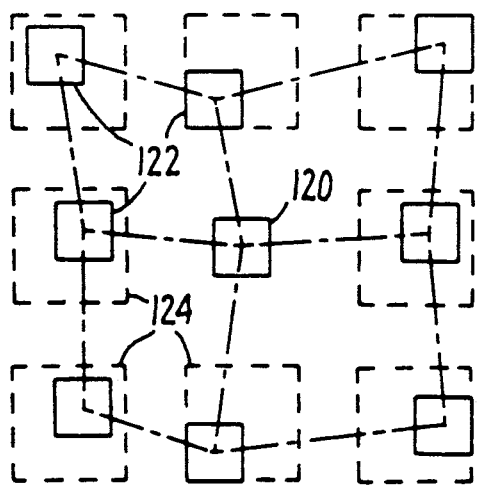
FIG_16C.

METHOD AND APPARATUS FOR VERIFYING IDENTITY USING IMAGE CORRELATION

BACKGROUND OF THE INVENTION

1. Field of the Invention

This invention relates generally to the field of verification of object identity by image correlation methods, and relates more particularly to a method and apparatus for verification of personnel identity by correlation of fingerprint images.

2. Description of the Relevant Art

Fingerprint matching is a commonly used and well accepted biometric method of personnel identification. Each fingerprint has a distinctive pattern of ridges and valleys that makes the fingerprint unique. The overall ridge patterns of fingerprints can be classified according to their distinctive shapes into several classes of morphology, including loops, arches, and whorls. The individual ridges of fingerprints have distinctive orientations, spacings, terminations, and bifurcations. Fingerprint matching methods are based on the premise that the combination of these features in any one fingerprint is unique.

One use of the fingerprint matching technique is in access control, wherein personnel are permitted or denied access to a controlled area based on comparisons with a data base of fingerprints. The controlled area may be a physical area, in which case access is controlled by a physical barrier, or a virtual area such as a computer program or data base, in which case access is controlled by an electric barrier. The data base of fingerprints is constructed during an enrollment procedure that consists of recording in some form the fingerprints of those individuals who are to be permitted access. Once the data base has been constructed, an individual will be granted access by way of a verification procedure only if the fingerprint presented for verification matches the stored fingerprint data of a particular enrolled individual.

Since manual methods of fingerprint matching are cumbersome, an automated method of personnel verification for access control is desirable. In order to be useful, such an automated method must accurately verify enrolled personnel, and must also accurately reject non-enrolled personnel. Inaccuracies in the verification process have been broken down into two types; a type one error is a false rejection of an enrolled individual, while a type two error is a false verification of a non-enrolled individual. Ideally, both type one and type two errors should be minimized, however, depending upon the application, an increased rate of one type of error may be tolerated in order to minimize the rate of the other type of error. For example, if the automated method is used to control access to a vault containing highly sensitive documents, the false verification rate should be very close, if not equal, to zero in order to protect against unauthorized access, while the inconveniences associated with a relatively large false rejection rate can be tolerated. On the other hand, if the cost of a false rejection is high and the penalty of a false verification is low, then a relatively high false verification rate can be tolerated in order to minimize the false rejection rate.

One factor that influences the accuracy of automated methods of access control is the repeatability of the process of imaging the fingerprint to be enrolled or verified. As indicated above, the use of fingerprint matching in access control utilizes two distinct procedures, enrollment and verification. In a typical automated method of access control, both the enrollment procedure and the verification procedure involve forming an optical image of the fingerprint of the individual to be enrolled or verified. The process of imaging a fingerprint typically involves sensing light reflected from the fingerprint, wherein the ridges and valleys of the fingerprint reflect the light differently. Inaccuracies may result from the imaging process itself by distortions of the fingerprint image caused by the imaging apparatus, and may also result from inconsistencies in alignment of the finger with the imaging apparatus or in variations of the moisture level of the finger surface. Another factor that influences the accuracy of automated methods of fingerprint matching is that the finger itself may change in size due to physiological or temperature related causes.

In addition to accuracy, other factors that effect the usefulness of automated methods of fingerprint matching include the cost of the automated apparatus, the speed of the enrollment and verification procedures, and the resistance of the method to tampering and misuse. Cost and speed are directly influenced by the efficiency of the enrollment procedure in accurately characterizing fingerprints by manipulating and storing a minimal amount of data.

SUMMARY OF THE INVENTION

Broadly stated, the present invention involves an image correlation method for use in verifying the identity of an object. One aspect of the method involves an enrollment procedure, and another aspect of the method involves a verification procedure. More specifically, the enrollment procedure of the method includes the steps of: forming a reference image of a reference object; identifying a plurality of reference sections of the reference image, where the image data contained in each of the reference sections is distinct relative to the image data adjacent to and surrounding the reference section; and saving the image data of each of the reference sections for later use in the verification procedure. After performing the enrollment procedure, the verification procedure can be performed. The verification procedure includes the steps of: forming a verify image of an object whose identity is to be verified, where the verify image includes a plurality of verify regions each corresponding in position to one of the reference sections and each larger in extent than its corresponding reference section; determining a best-match location within each verify region at which the image data is most similar to the image data of its corresponding reference section; and verifying the identity of the object according to the degree of similarity between the image data of the best-match locations and the corresponding reference sections and according to the degree of similarity between the relative positioning of the best-match locations and the corresponding reference sections.

More narrowly stated and in accordance with the illustrated preferred embodiment, the present invention provides a method and apparatus for verification of personnel identity by correlation of fingerprint images. The method includes the steps of: first enrolling a person by the steps of forming a reference image of a fingerprint of the person, identifying a plurality of reference sections within the reference image, where the image data contained in each of the reference sections is locally unique, and saving the image data of each of the reference sections; and then verifying the identity of someone claiming to be an enrolled person by the steps of retrieving the image data of the reference sections of the enrolled person, forming a verify image of the fingerprint of the person claiming to be enrolled, where the verify image includes a plurality of verify regions each corresponding in relative position to one of the reference sections and each larger in extent than its corresponding reference section, determining a best-match location within each verify region at which the image data is most similar to the image data of its corresponding reference section, and verifying the identity of the person claiming to be enrolled according to the degree of similarity between the image data of the best-match locations and the corresponding reference sections and according to the degree of similarity between the relative positioning of the best-match locations and the corresponding reference sections.

The apparatus of the present invention consists primarily of an imaging device for forming the images of the fingerprints, and a programmed computer and appropriate interface circuits for performing the tasks of selecting the reference sections, saving and retrieving the image data contained in the reference sections, aligning the reference sections on a fingerprint image to be verified by calculating the best-match locations, and verifying identity based on the results of the alignment task. In the preferred embodiment, the imaging device forms a grey scale image of the fingerprint consisting of a rectangular array of pixels (picture elements), where each pixel has a digital value ranging from one value that represents white to another value that represents black, with values representing shades of grey in between. Within the computer, for ease of computation, the fingerprint images are preferably represented in binary form, namely black and white pixels, with the conversion from grey scale to binary form being performed either by hardware external to the computer or by the computer itself.

One aspect of the method for verification of identity by correlation of fingerprint images includes the definition of the reference sections that characterize the fingerprint of an enrolled individual. During the enrollment procedure, the reference fingerprint image of the person enrolling is analyzed for purposes of identifying distinctive areas of the fingerprint image. Most often these distinctive areas correspond to fingerprint features such as ridge terminations and bifurcations, ridge islands, cores, deltas, and other differentiating features commonly found in fingerprints.

The reference fingerprint image is effectively partitioned into a series of relatively small candidate reference sections, each of which is analyzed to determine whether it is distinctive enough to be selected as one of the reference sections. In the preferred embodiment, for quality control purposes, an initial evaluation is performed on the grey scale image data of each candidate reference section. If the candidate reference section is too light, the candidate reference section is rejected because it is outside the boundaries of the useful fingerprint image. If the contrast among the pixels of the candidate reference section is too small, it is also rejected. Also, the candidate reference section is rejected if it is too close to the physical edge of the fingerprint image, or if it is too dark.

After the initial evaluation of candidate reference sections, a series of calculations are performed in the preferred embodiment to determine the uniqueness or distinctiveness of each remaining candidate reference section as compared to an area of the reference fingerprint image immediately surrounding the candidate reference section. Preferably, for reasons of computational speed, these calculations are performed on binary (black and white) images rather than the grey scale images. The area surrounding the candidate reference section is converted into a binary image according to the median grey level within that area. In other words, all pixels having values darker than the median grey level are converted into black pixels and all pixels having values lighter than the median grey level are converted into white pixels. At the same time, a filtering or smoothing process is performed to remove noise and smooth edges.

Each candidate reference section is also converted into a binary equivalent of the grey image, but by another process, identified herein as "trinarization." In order to eliminate the uncertainty and variability of edge determinations in a process that converts grey images into binary images according to the median grey level, the trinarization technique divides all pixels into one of three levels, black, grey, and white. A histogram of grey values of the grey scale image is determined and black-grey and grey-white threshold values are established according to equal one-third distributions. All pixels having grey values darker than the black-grey threshold value are converted into black pixels; all pixels having grey values lighter than the grey-white threshold value are converted into white pixels; all other pixels are ignored in subsequent correlation calculations. Thus, the black and white pixels represent with high confidence ridge and valley regions of the fingerprint image, while the grey pixels represent the transition regions between the ridges and valleys.

Once a candidate reference section has been trinarized and the surrounding area has been binarized, an autocorrelation calculation is performed in the preferred embodiment in which the local distinctiveness of the candidate reference section with respect to the underlying reference fingerprint image is determined. The term "autocorrelation" is used herein as referring to a series of individual correlation calculations each performed between the trinarized image data of the candidate reference section and the binarized image data of a subfield of the surrounding area, equal in size to the candidate reference section, and offset within the surrounding area by varying amounts. The method of the present invention assumes that high correlations between the candidate reference section and other locations within the surrounding area means that the candidate reference section is not very distinctive and is, thus, not suitable for use in characterizing the fingerprint image. Such a high correlation will occur, for example in cases where the candidate reference section image includes only parallel ridges without any distinctive fingerprint features. One would expect a high correlation between such a candidate reference section and locations within its surrounding area when the candidate reference section is displaced in a direction parallel to the ridges or displaced by multiples of a ridge spacing in a direction perpendicular to the ridges. On the other hand, a candidate reference section image that includes a ridge termination may be unique within the surrounding area, in which case only low correlations will be found. Since high correlations are obtained at locations at or near the original location of the candidate reference section, such locations are excluded in the autocorrelation calculation. The autocorrelation score of each candidate reference section is the highest correlation value occurring within the surrounding area, except for the excluded region near the center of the surrounding area.

Once the autocorrelation calculation has been performed between each candidate reference section and its corresponding surrounding area of the reference fingerprint image, the candidate reference sections are ranked in the preferred embodiment according to their autocorrelation scores, with low correlation scores being most desirable because such scores represent locally unique or distinctive candidate reference sections. A predetermined number of the most distinctive candidate reference sections are then further tested against additional reference fingerprint images of the same person to determine the repeatability of accurately matching the candidate reference sections to subsequent fingerprint images. The most distinctive and repeatable candidate reference section is identified as the primary reference section, which will be used during the verification procedure to align the reference sections of the template with respect to subsequent fingerprint images. At the conclusion of this reference section identification and selection process, a set of distinctive reference sections is selected as a "template" that best represents the reference fingerprint image. The trinarized image data contained in the reference sections of the template along with data characterizing their relative positions is then stored, thereby completing the enrollment procedure.

Another aspect of the method for verification of identity by correlation of fingerprint images includes the verification procedure, in which a person seeking access and claiming to be enrolled provides a fingerprint for comparison with the template of the enrolled person. In the preferred embodiment, a verify fingerprint image is obtained from the person seeking access and is filtered and binarized. The image data defined by the template of the enrolled person is retrieved from storage and is compared to the verify fingerprint image.

As an initial step in the verification procedure, according to the preferred embodiment, the template is aligned with respect to the verify fingerprint image to cancel out translational misalignment of the person's finger in the imaging device. In order to align the template to the verify fingerprint image, the primary reference section is first located on the verify fingerprint image by determining a "best-match" location within a search region at which the correlation between the primary reference section and the underlying verify fingerprint image is the greatest.

Once the primary reference section is located on the verify fingerprint image, the remaining reference sections are then located relative to the best-match location of the primary reference section. A two dimensional translation correction is determined according to the best-match location of the primary reference section, and is used in subsequently locating the expected positions of the remaining reference sections. For each of the remaining reference sections, a verify region is defined centered at the expected position of the reference section. The verify region is larger in extent than the reference section to allow for rotational misalignment and dimensional changes of the finger. A best-match location is determined within each verify region at that location within the verify region at which the correlation between the trinarized image data of the reference section and the binarized image data of the verify fingerprint image is the highest. The best-match location of each reference section may occur at the center of the verify region, or may occur at a location displaced therefrom. Next, a rotational correction is performed to minimize the displacements of the best-match locations from their respective expected positions in order to cancel out rotational misalignment of the verify fingerprint image relative to the reference fingerprint image obtained during the enrollment procedure.

Once all of the reference sections have been matched to the verify fingerprint image and their correlations have been computed, an evaluation of the correlation values and corrected displacements is then performed to determine whether to verify or reject the person seeking access as the enrolled person. Each reference section is classified as a "hit" or a "miss" according to its correlation value and corrected displacement. A relatively high correlation value and a relatively low displacement value are required in order to be classified as a hit. Finally, if the number or percentage of hits exceeds a predetermined threshold, the person is verified; if not, the person is rejected.

Several features of the present invention combine to provide a verification method with significant advantages over other such methods known in the prior art. One feature is the care in selecting the reference sections of the template to ensure an accurate and repeatable characterization of each fingerprint presented for enrollment. Another feature is the compact size of the image data of the reference sections, which permits such data to be easily and efficiently stored. Still another feature is that, due to the efficiency of the method and the compactness of the template data, a fingerprint verification apparatus can be constructed compactly and inexpensively. Still another feature is the robustness of the verification procedure, which tolerates imperfect fingerprint image data caused by misalignment, partial image, and other factors. A further feature is the speed and accuracy of the verification procedure, which increases the usefulness of verification apparatus constructed according to the present invention. A still further feature is that the underlying method of object identification need not be limited to only fingerprint image identification; other useful applications for the method of the present invention will be obvious to those skilled in the art of object identification.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 1 is a perspective view of a fingerprint verification terminal that incorporates the present invention.

FIG. 2 is a perspective schematic view of a fingerprint imaging device of the fingerprint verification terminal.

FIG. 3 is a schematic illustration of an exemplary light path through an optical element of the fingerprint imaging device.

FIG. 4 is an enlarged view of a portion of FIG. 3.

FIG. 5 is a block diagram of the fingerprint verification terminal, including the fingerprint imaging device, a computer, and associated interface circuitry.

FIGS. 16A through 16C are schematic illustrations of a rotational correction accomplished during the verification procedure.

FIG. 17 is a schematic plot of correlation values versus corrected displacement values determined during the verification procedure and used as criteria for verification and rejection.

DETAILED DESCRIPTION OF THE PREFERRED EMBODIMENTS

Figure 6:
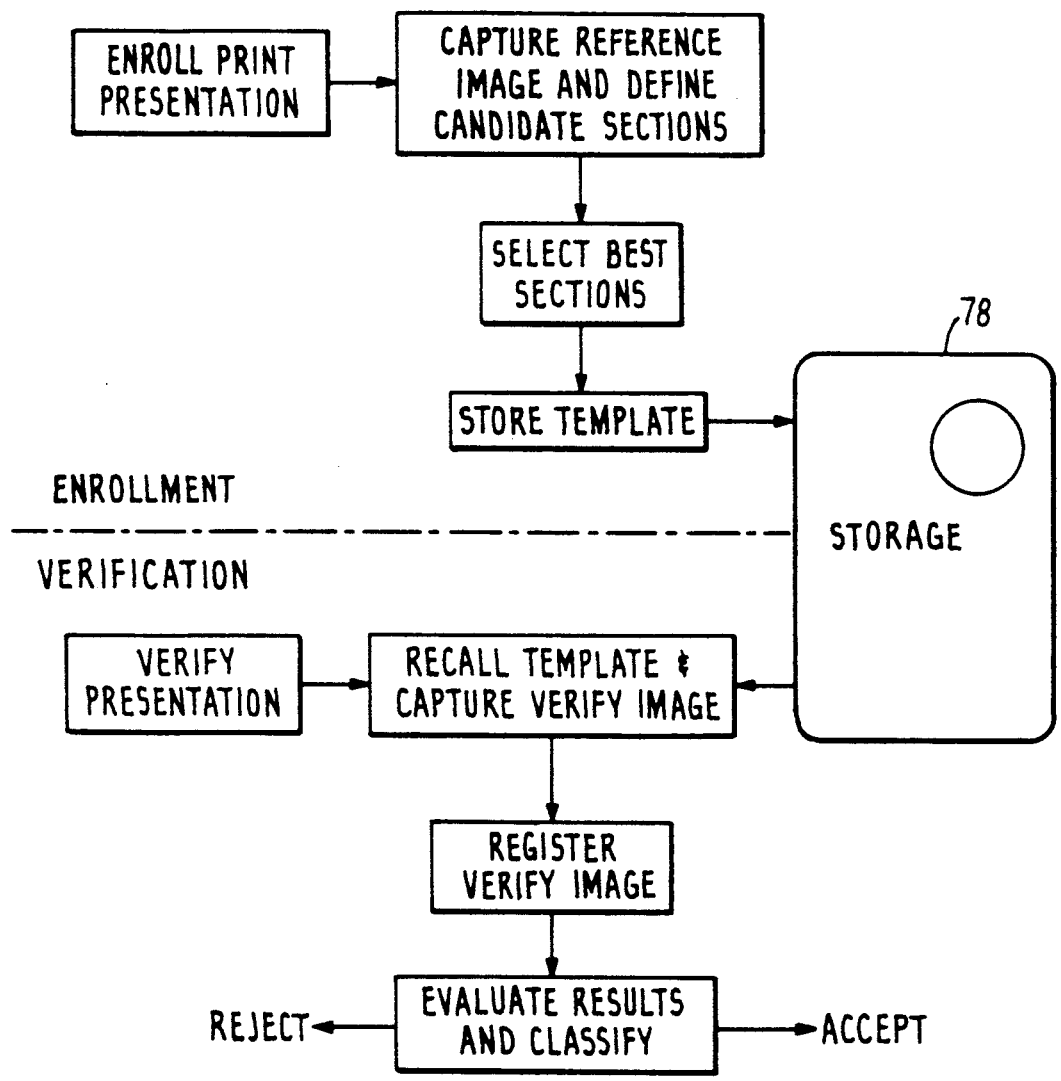
FIG. 6 is a simplified flow chart of the fingerprint verification method of the present invention.

FIGS. 1 through 17 of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

The preferred embodiments of the present invention are a method and an apparatus for verification of personnel identity by correlation of fingerprint images. As shown in FIG. 1, a fingerprint verification terminal 10 incorporates the method and apparatus of the present invention. The verification terminal 10 includes a housing 12 that encloses the fingerprint verification apparatus of the present invention. The housing 12 includes an inclined front panel 14 on which a keyboard 16 and a display 18 are mounted. The front panel 14 further includes a recess in which an optical element 20 of an imaging device is mounted. The preferred embodiment of the apparatus of the present invention incorporates certain aspects of an imaging device as disclosed in U.S. Pat. No. 4,537,484, issued Aug. 27, 1985 to Fowler, et al., which is herein incorporated by reference.

The verification terminal 10 is used for both enrollment and verification. If the individual has been previously enrolled, the individual is requested to enter his personal identification number, name, or other form of identification. Then, the individual places a finger 22 or thumb in the recess defined by the optical element 20. Sensing circuitry of the verification terminal 10 detects the presence of the digit on the element, which causes a series of prompting messages to be shown on the display 18. The finger 22 is then scanned utilizing the imaging device to provide an image that corresponds to the individual's fingerprint. Next, a comparison is performed between the present fingerprint image and fingerprint image data previously defined and stored during enrollment. If the comparison is positive, the individual's identity is confirmed and he is granted access. If the comparison is negative, the individual is not granted access.

The enrollment procedure is similar to the verification procedure in that the individual's finger is optically scanned and image data corresponding to the fingerprint image is processed and stored in a non-volatile memory. Also, identification information, such as the individual's name or personal identification number, is entered into the terminal 10 via the keyboard 16. Security personnel are typically present during the enrollment procedure to verify the individual's identity. Once the individual has been enrolled, physical or virtual access may be obtained by the individual utilizing the previously-described verification procedure, during which time security personnel need not be present.

Details of the imaging device 52 are seen in FIG. 2 to include the optical element 20, a light source 24, mirrors 26 and 28, lens 30, and a light sensor 32. The elements 24 through 32 are mounted on a carriage 34, which is rotatably positioned about an axis 36 by a stepper motor 38. The optical element 20 is stationary, and its curved surfaces are polished so as not to disperse light passing therethrough. Preferably, the curved surfaces of the optical element 20 have axes that are coincident with the carriage rotation axis 36.

As shown in FIGS. 3 and 4, light rays from the light source 24 enter the optical element 20, some of which are reflected from the upper curved surface 40 thereof back to the sensor 32 by way of the mirrors 26 and 28 and the lens 30. At locations on surface 40 where the finger is not in contact due to the presence of a valley 42 in the fingerprint, the incident light 44 is totally reflected to the sensor 32. However, at locations on the surface 40 where ridges 46 of the fingerprint are in contact with the surface 40, most of the incident light 48 is absorbed by the finger 22 instead of being totally reflected to the sensor 32.

At any one rotational orientation of the carriage, the sensor 32 is scanned to create a one-dimensional image of a section of the fingerprint parallel to the axis 36. In order to create a two-dimensional image of the fingerprint, the carriage 34 is rotated throughout an arc and the sensor 32 is periodically scanned until the fingerprint image has been completely formed.

The hardware of the fingerprint verification terminal 10 is seen in FIG. 5 to include a programmed computer 50 that is utilized as the control and data processing hub of the terminal. Due to the simplicity of the calculations required by the verification method, the computer 50 can be a microprocessor based microcomputer. In addition to the above-described elements, the imaging device 52 also includes a position detector 54 that is coupled to the stepper motor 38 for detecting the rotational position of the stepper motor and the carriage 34. The imaging device 52 also includes a lamp, motor, and detector control circuit 56, which is coupled to the computer 50 via a control interface 58. The control circuit 56, under computer control, turns on the light source 24 and directs the stepper motor 38 to rotate the carriage when an fingerprint image is needed. The position detector 54 informs the computer 50 of the rotary position of the motor 38 and carriage 34 so that the light sensor can be scanned at the appropriate times to create the two-dimensional video image of the fingerprint. The computer 50 receives fingerprint images from the light sensor 32 through a video interface circuit 60, which digitizes the analog signals generated by the light sensor. Alternatively, the video signal can be routed from the video interface circuit 60 to the computer 50 through a filter circuit 62 and a binarizer circuit 64. The filter circuit 62 preferably utilizes a LAPLACIAN filtering technique to smooth the edges and remove noise from the image data. The binarizer circuit 64 converts the grey-scale image data supplied by the video interface 60, pixel by pixel, into binary image data, black and white, preferably according to the local median grey level of the incoming pixels.

In addition to the imaging device 52, other peripherals are coupled to the computer 50. A memory 66 is coupled to the computer 50 and is utilized as a scratch pad memory during the enrollment and verification procedures. The memory 66 may also include a non-volatile portion for use in storing the program executed by the computer 50, and also storing the fingerprint enrollment data, which is generated during the enrollment procedure and which is retrieved during the verification procedure. Other storage devices for storage of the fingerprint enrollment data can be accessed through an input/output interface circuit 68. Smart cards, which are credit card sized devices with on-board processing and memory capability, can be accessed through a smart card interface circuit 70 for use in storing the fingerprint enrollment data of any particular individual. In such case, the individual can carry with him at all times his particular enrollment data, which could be called upon to provide access through verification terminals without local data storage. Other storage devices such as disk drives or other computers can be accessed through an RS-232 port 72 or a network driver circuit 74.

The computer also interfaces with other input and output devices, including the keypad 16 and the display 18, which are located on the face of the fingerprint verification terminal 10 and are used to interact with the user of the terminal. A door relay 76 can be actuated by the computer 50 through the input/output interface 68 to provide means for allowing physical access to an individual upon the successful conclusion of a verification procedure.

Having thus described the fingerprint verification apparatus of the present invention, the fingerprint verification method of the present invention will now be explained in relation to FIGS. 6-17. As shown in FIG. 6, the fingerprint verification method can be divided into two procedures, enrollment and verification. The purpose of the enrollment procedure is to characterize the fingerprint of a person being enrolled, and to store certain information about the fingerprint for later use in the verification procedure. As a first step in the enrollment procedure, the individual seeking enrollment places his finger 22 on the optical element 20 and instructs the fingerprint verification terminal 10 to begin the enrollment process. The imaging device 52 of the fingerprint verification terminal 10 first captures an image of the individual's fingerprint, labeled in FIG. 6 as a reference image. As described above, the reference fingerprint image consists of a two dimensional array of pixels (picture elements) that is generated by the imaging device 52. The computer, under program control, subdivides the image into relatively small areas, denoted herein as candidate reference sections. Each candidate reference section is analyzed to determine its level of local distinctiveness and repeatability, and the most distinct and repeatable reference sections are selected for use in characterizing that fingerprint. This group of reference sections, denoted herein as a template, contains small pieces of the image data of the reference fingerprint image, each containing a locally unique landmark feature. At the conclusion of the enrollment procedure, the template is stored in some form of a non-volatile memory, such as a smart card 78.

The second half of the fingerprint verification method involves the verification procedure, the purpose of which is to verify or reject a person seeking access based on a comparison of that person's fingerprint with the template of whomever that person claims he is. During the verification procedure, the person seeking access identifies himself by keying in his name or personal identification number or some other indication of his identity. The computer, under program control, retrieves the template of the enrollee identified by the person seeking access for use in verifying whether of not that person is the enrollee. The computer also directs the imaging device 52 to capture a verify fingerprint image from the person seeking access. Once the verify fingerprint image has been obtained, the next step of the method is to register the template with respect to the verify fingerprint image and to determine how closely the image data contained in the template matches the corresponding image data of the verify fingerprint. Based on the results of this determination, a decision is then made as to whether the person seeking access is or is not the same person as the enrollee. If the person's identity is verified, then access is permitted; if not, access is denied.

Figure 7A:
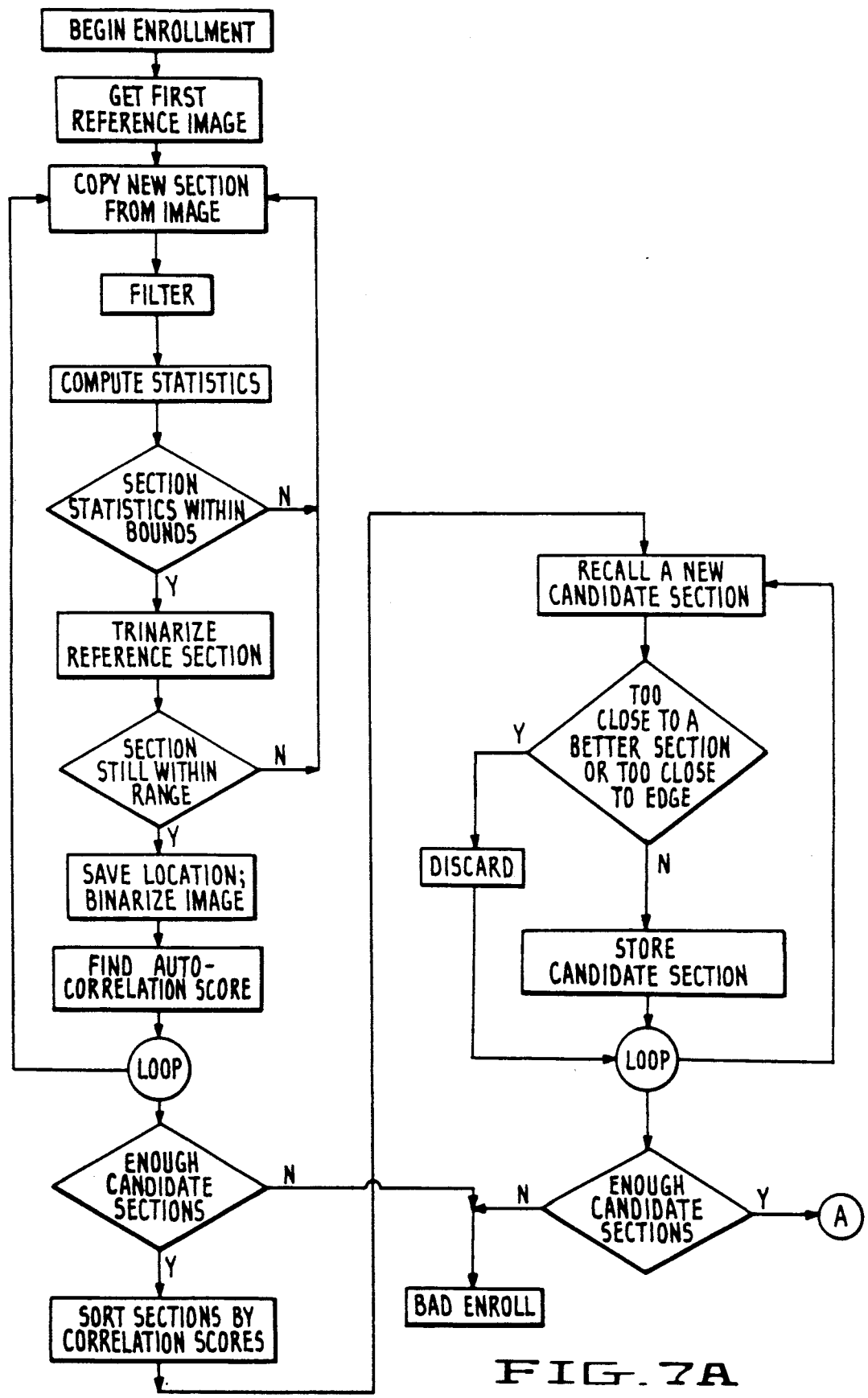
FIGS. 7A and 7B are detailed flow charts of an enrollment procedure of the fingerprint verification method.
Figure 7B:
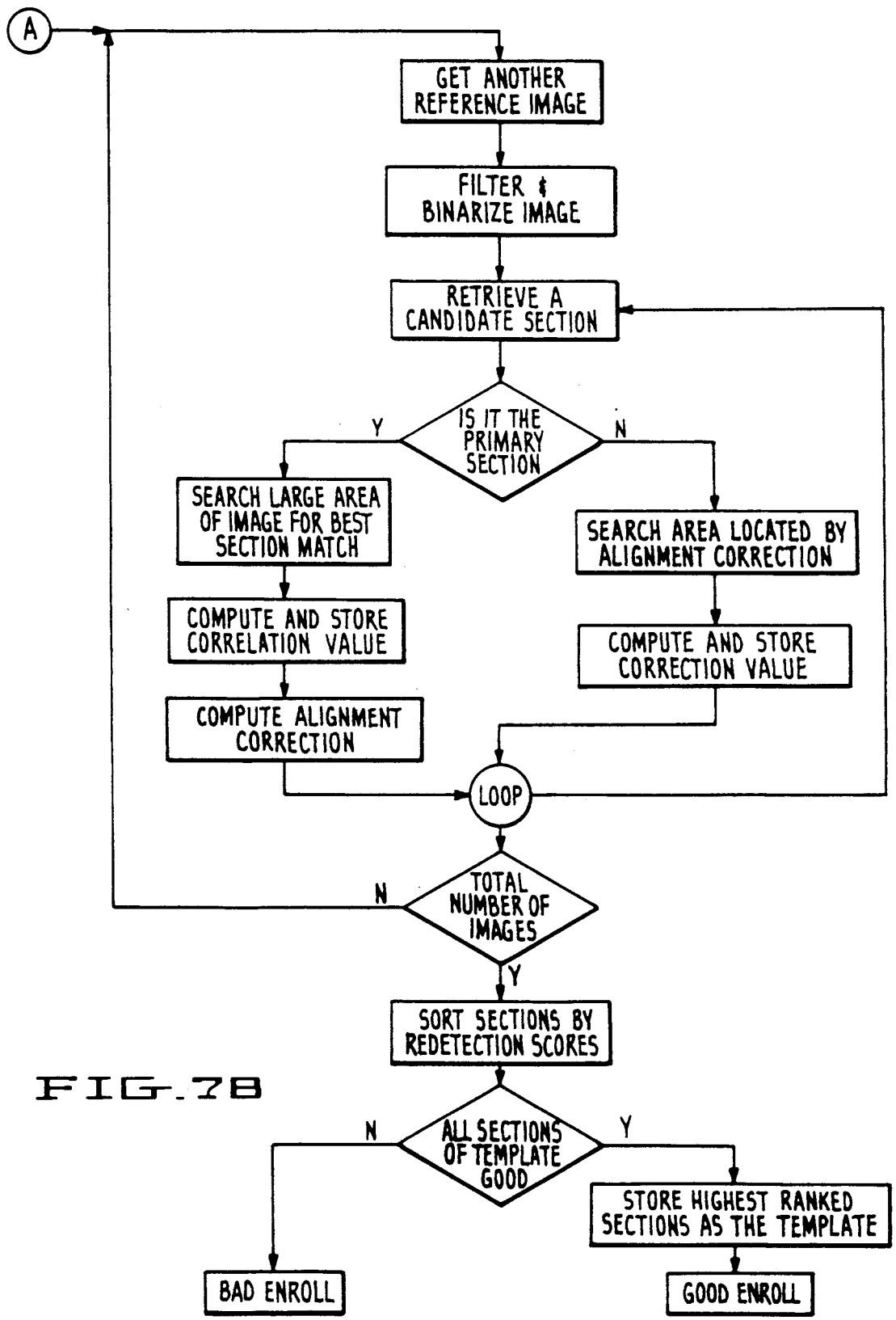
Figure 8:
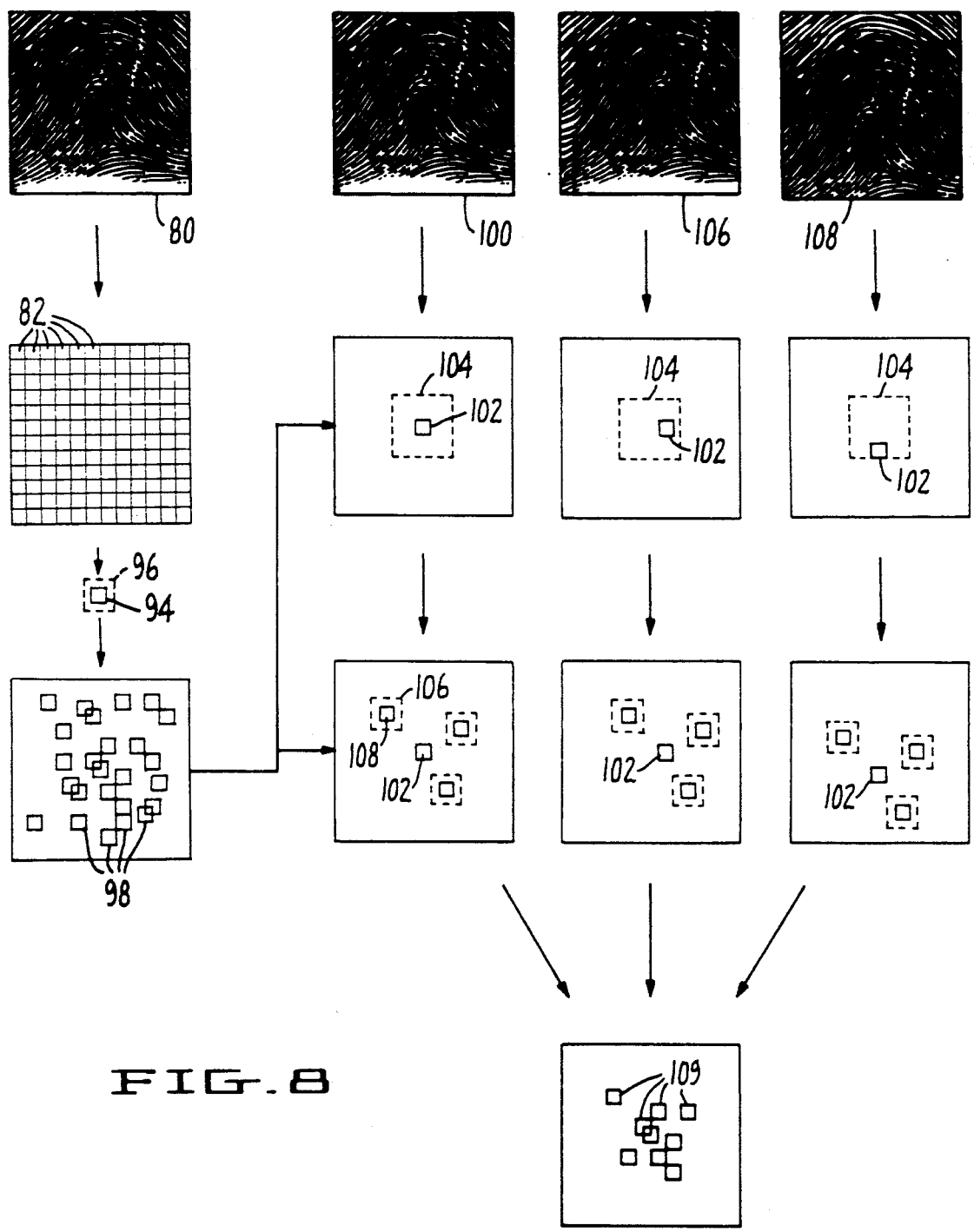
FIG. 8 is a schematic illustration of a process of selecting reference sections during the enrollment procedure.

With the above abbreviated description of the method of the present invention in mind, the method will now be described in greater detail. FIGS. 7A and 7B illustrate the flow chart of the program executed by the computer 50 during the enrollment procedure, while FIG. 8 schematically illustrates the enrollment procedure. The first step in enrolling an individual is to capture a fingerprint, the first reference fingerprint image. To do so, the computer instructs the imaging device 52 to illuminate the individual's finger 22, to rotate the carriage 34 and attached imaging apparatus, and to generate a two-dimensional pixel image, in grey tones, of the individual's fingerprint. During the initial stages of the enrollment procedure, the computer 50 uses the actual grey values instead of the binary equivalents, thus, the video data is in this case supplied directly to the computer, bypassing the filter and binarizer circuits 62 and 64.

Once the reference fingerprint image 80 (FIG. 8) has been captured, the fingerprint image is divided into candidate reference sections 82, each of which is evaluated for possible inclusion in the template. Each candidate reference section 82 is small in area compared to the entire reference fingerprint image. In the preferred embodiment, for example, the size of the image area is 384 by 384 pixels, while the size of each candidate reference section is 32 by 32 pixels. In order to ensure that distinctive areas of the reference fingerprint image are not missed, adjacent candidate reference sections overlap by 16 pixels.

One by one, each of the candidate reference sections is evaluated according to several criteria. At the beginning of a program loop, a LAPLACIAN filtering calculation is performed to remove noise and smooth edges. Then, the grey level values of a candidate reference section is copied into a working area of the memory, and various statistical parameters are calculated. A histogram of the grey value distribution of the pixels of the candidate reference section is created and the median, one-third, and two-thirds grey threshold values are determined. If the median grey level is too bright or too dark, then the candidate reference section is rejected. The bottom row of candidate reference sections in the reference fingerprint image 80 would be rejected by this test. Next, if the range between the one-third and two-thirds threshold values is too narrow, then the contrast is poor and the candidate reference section is rejected. The candidate reference section is not considered further if it is too close to the edge of the physical fingerprint image.

Figure 9:
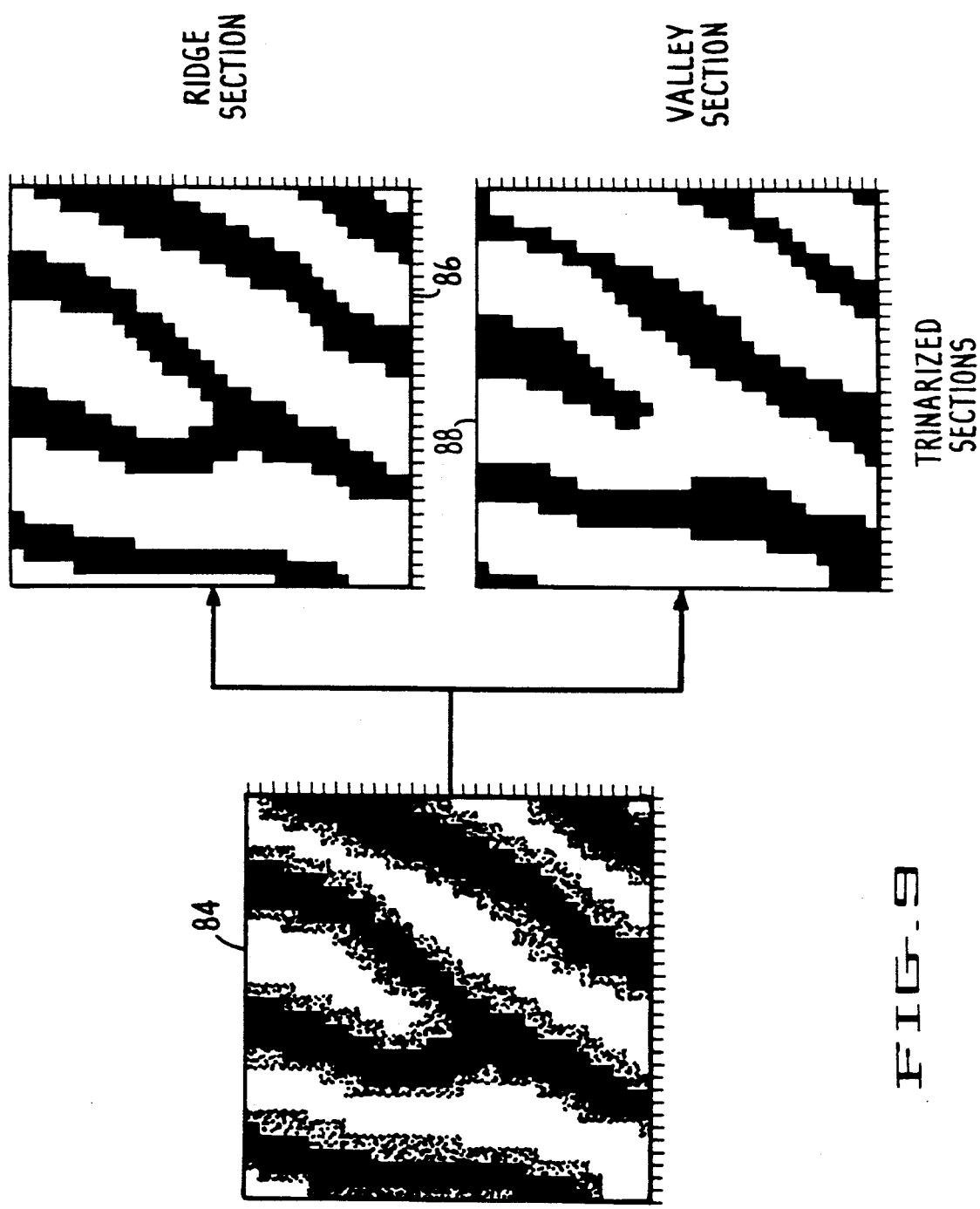
FIG. 9 is a schematic illustration of a process of trinarizing the image data of a reference section.

If the candidate reference section survives these initial tests, then the grey scale image data is "trinarized" to eliminate from succeeding calculations those pixels having grey scale values in the middle third of the distribution. This trinarization process allows the subsequent correlation calculations to be performed using binary arithmetic, while eliminating the uncertainty and variability caused by edge placements in converting the grey scale image data into binary image data. As shown in FIG. 9, the pixels of the candidate reference section 84 can be thought of as having either a black value, a grey value, or a white value, depending upon their grey scale values relative to the one-third and two-thirds thresholds. During the trinarization process, only white and black pixels of the candidate reference section 84 are used in subsequent calculations; the grey pixels are effectively discarded. Two new images, a ridge section 86 and a valley section 88, are generated by the trinarization process. Assuming that black pixels represent ridges of the fingerprint, then all pixels in the black third of the grey scale distribution are given black values (1 or true) in the ridge section 86 and all others are given white values (0 or false). Also, all pixels in the white third of the grey scale distribution (valleys) are given black values (1 or true) in the valley section 88 and all others are given white values (0 or false). Thus, the black (true) pixels of the ridge section 86 represent ridges and the black (true) pixels of the valley section 88 represent valleys. The resulting binary data contained in the ridge and valley sections 86 and 88 represent those areas of the reference fingerprint image in which ridges and valleys will be consistently found, regardless of edge variability.

Figure 10:
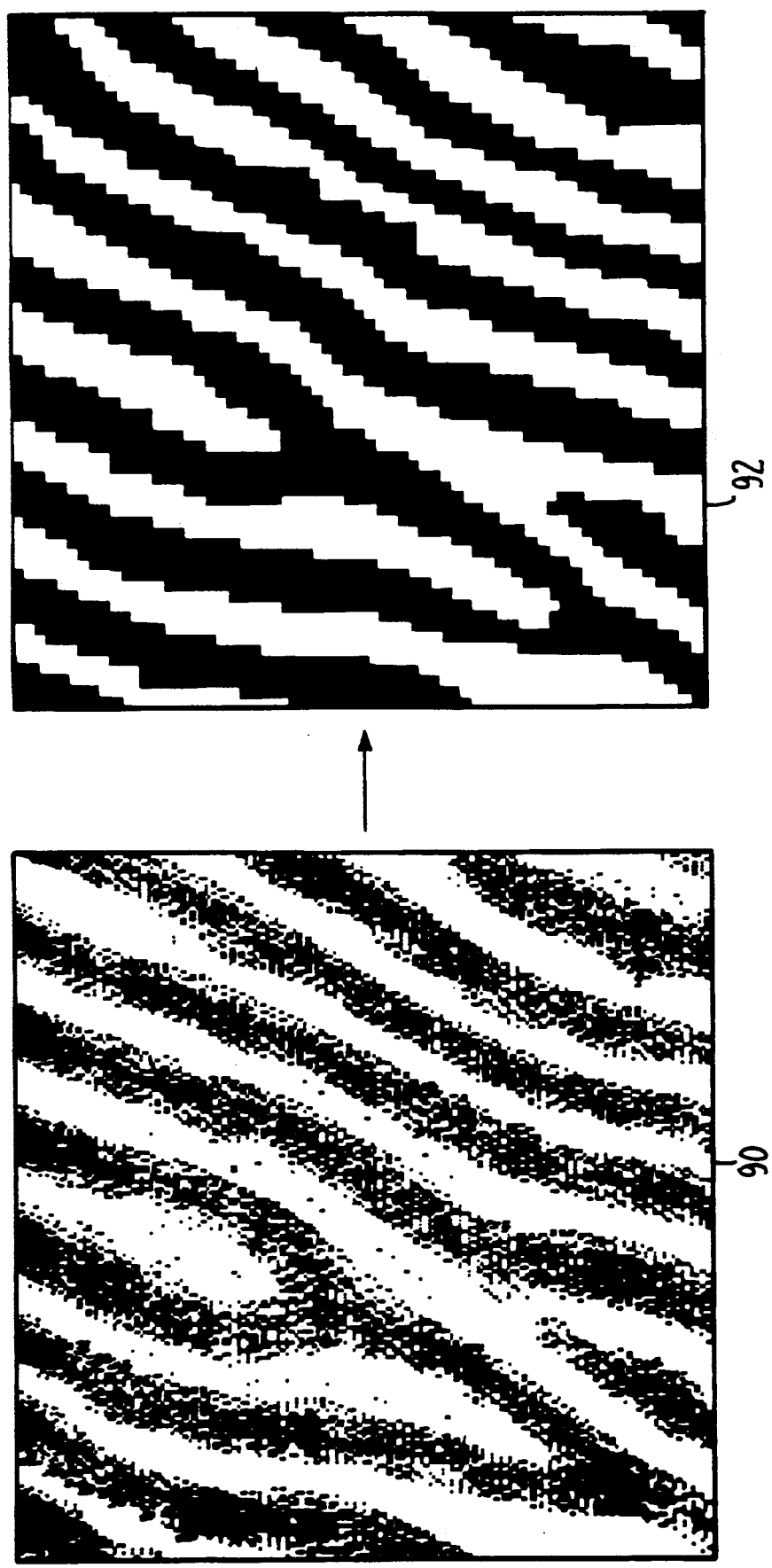
FIG. 10 is a schematic illustration of the process of binarizing fingerprint image data.

With reference now back to FIG. 7A, the next step after the trinarization is to test whether the now trinarized ridge and valley section images 86 and 88 contain enough black pixels. Ideally, each should contain about one third black pixels, but if the number of pixels is below a threshold of, for example, twenty percent, the candidate reference section is rejected and the loop continues with the next adjacent candidate reference section. If the candidate reference section passes this test, then the location of the candidate reference section is saved and an area of the reference fingerprint image surrounding the location of the candidate reference section is binarized. During this binarization by the programmed computer, an area of the reference fingerprint image surrounding the candidate reference section is converted into a binary image according to the median grey level within the area. In other words, all pixels having values darker than the local median grey level are converted into black pixels and all pixels having values lighter than the median grey level are converted into white pixels. FIG. 10 schematically illustrates the conversion through binarization of a grey level image 90 into a binary image 92.

Figure 11:
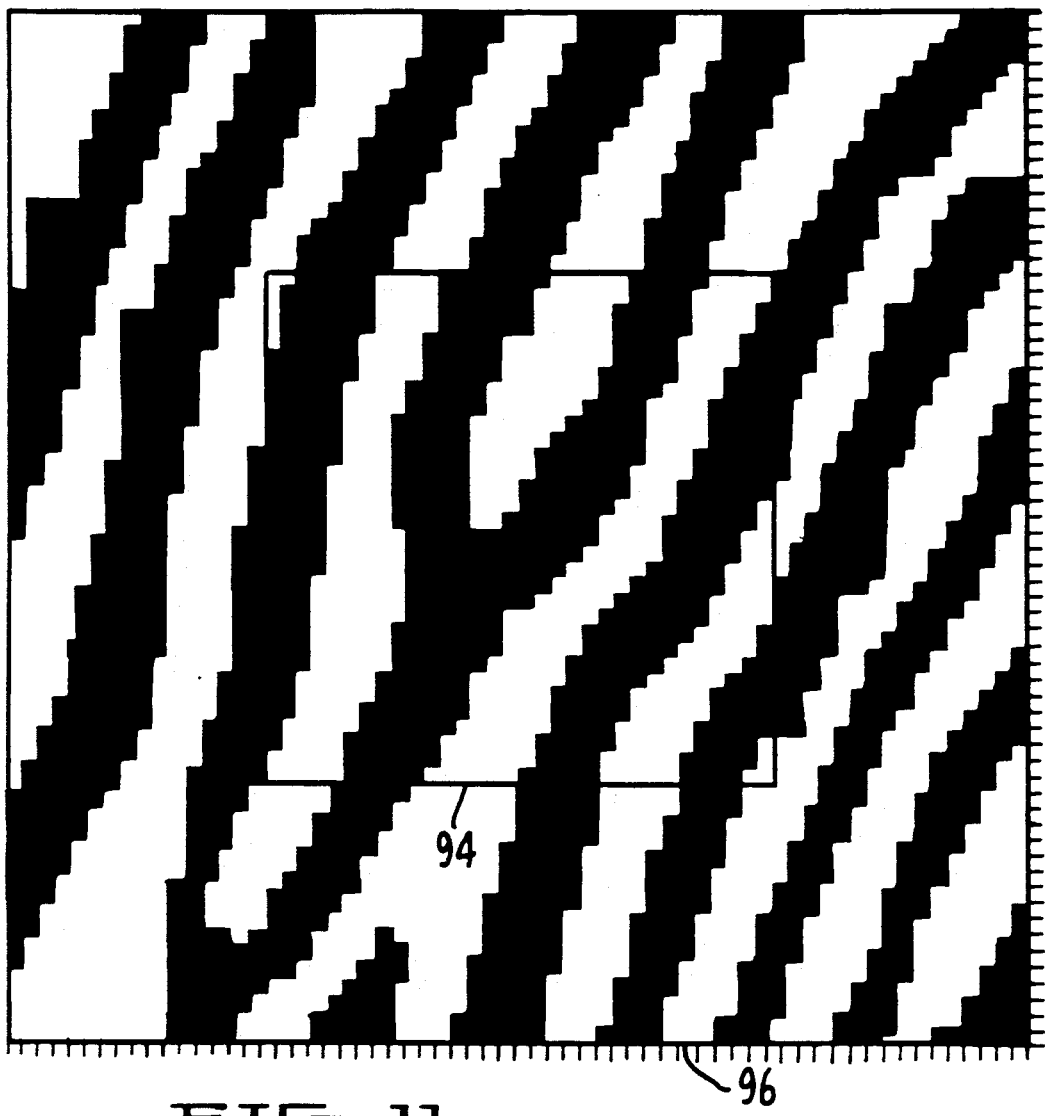
FIG. 11 is a schematic illustration of a reference section and an area surrounding the reference section within which an autocorrelation calculation is performed.

The area binarized is larger than the candidate reference section because the next step is to determine the local uniqueness of the candidate reference section within its surrounding area. In the preferred embodiment, as illustrated in FIG. 11, the candidate reference section 94 is 32 by 32 pixels in size and the surrounding area 96 is 64 by 64 pixels in size. Once a candidate reference section has been trinarized and the surrounding area has been binarized, an autocorrelation calculation is performed in which the distinctiveness of the candidate reference section within its surrounding area is determined. The term "autocorrelation" is used herein as referring to a series of individual correlation calculations each performed between the trinarized image data of the candidate reference section and the binarized image data of a subfield of the surrounding area equal in size to the candidate reference section and offset within the surrounding area by varying amounts. This calculation is labeled "auto" because it involves correlations between portions of the same image data.

Each correlation calculation results in an autocorrelation score that indicates the degree of similarity between the candidate reference section and the subfield of the reference fingerprint image. Since the image data of both the trinarized candidate reference section and the binarized subfield are binary values, the correlation calculation is fairly simple, which results in a rapid determination of the measure of uniqueness. The formula is:

$$CV = SUM[(R \text{ and } S) \text{ or } (V \text{ and not } S)]/Sum[R \text{ or } V];$$

where CV is the correlation value, Sum is a summation operation over all of the pixels of the candidate reference section (e.g., 32 by 32), R is the binary value (1 or 0) of the trinarized ridge section 86 of the candidate reference section, V is the binary value (1 or 0) of the trinarized valley section 88 of the candidate reference section, and S is the binary value (1 or 0) of the subfield of the surrounding area 96. In effect, this calculation counts the number of times that a ridge (R = 1 and S = 1) occurs in both the candidate reference section and the subfield plus the number of times that a valley occurs in both the candidate reference section and the subfield (V = 1 and S = 0), divided by the total number of ridge and valley pixels in the candidate reference section. If the correlation value is equal to one, then there is a perfect match between the image data of the candidate reference section and the subfield; if the correlation value is equal to zero, then there is no relationship between the image data of the candidate reference section and the subfield.

The autocorrelation routine seeks to determine how unique the candidate reference section is with respect to its surrounding area. A correlation value is calculated for nearly every possible location of the candidate reference section within the surrounding area. The higher the correlation value, the more similar the candidate reference section is to that location of the surrounding area. Regardless of the content of the candidate reference section, the correlation value with the subfield located in the center of the surrounding area will, by definition, be equal to one. High correlation values will also be obtained within a few pixels offset from the center location due to the elimination of the medium grey pixels from the ridge and valley sections 86 and 88 during the trinarization process. Accordingly, the locations at which high correlation values are expected are eliminated from the autocorrelation calculation by performing the correlation calculation only at locations outside of a small radius from the center location. In the preferred embodiment with 32 by 32 reference sections and 64 by 64 surrounding areas, an area having a 6 pixel radius is utilized as an exclusion area.

Figures 12A, 12B, 12C:
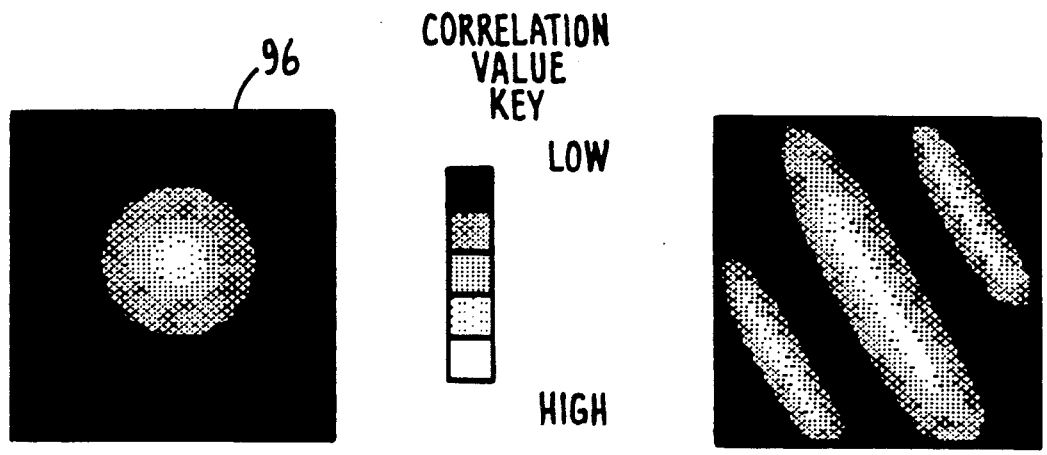
FIGS. 12A through 12C are schematic illustrations of the results of the autocorrelation calculation.

The uniqueness or distinctiveness of a candidate reference section is a function of the maximum correlation value outside of the central exclusion area. A very distinctive or unique candidate reference section having, for example, a ridge bifurcation, such as candidate reference section 94 in FIG. 11, will have high correlation scores only near the center of the surrounding area 96 and within the exclusion area. This result is shown in FIG. 12A, wherein the only high correlation values are to be found at the center of the surrounding area 96 and low correlation values are found elsewhere. The reason that the candidate reference section 94 has a low correlation outside the central exclusion area is that no other ridge bifurcations exist within the surrounding area.

If, on the other hand, the candidate reference section contains only parallel ridges and valleys, the result of the autocorrelation process would be a map of correlation values as shown in FIG. 12C. Note that fairly high correlation values are obtained at multiples of the ridge spacing from the central locations because the ridges of the candidate reference section are not very unique within the surrounding area. Thus, candidate reference sections having high correlation values outside the central exclusion area denote poor choices for the template, while candidate reference sections having uniformly low correlation values outside the central exclusion area are good choices for the template.

The result of the autocorrelation step is a number, the autocorrelation score, which is equal to the highest correlation value found outside the central exclusion area. A low autocorrelation score indicates a locally unique candidate reference section, while a high autocorrelation score indicates a candidate reference section that is not particularly unique.

In reference now to FIG. 7A, the next step in the process after the autocorrelation calculation is to loop back and perform the same series of steps on the next adjacent candidate reference section. Once all of the candidate reference sections have been evaluated, the number of candidate reference sections remaining under consideration is tested to determine whether enough remain. If not, the enrollment procedure terminates with a bad enrollment indicated to the individual seeking enrollment. If enough candidate reference sections remain, then they are sorted according to their autocorrelation scores, with lower autocorrelation scores denoting the most unique and desirable candidate reference sections. Next, the list of candidate reference sections is scanned to determine whether any two adjacent candidate reference sections remain on the list, and, if so, the less unique candidate reference section is discarded. An overlap of fifty percent (adjacent candidate reference sections) is not permitted, while an overlap of twenty-five percent (diagonal candidate reference sections) is permitted. At this point, candidate reference sections may also be rejected as too close to a too-white (too bright) or too-grey (poor contrast) region of the reference fingerprint image. If the candidate reference section does not overlap a more unique adjacent candidate reference section, then the image data for that candidate reference section is stored in memory. Once the trinarized image data and positional coordinates of all of the acceptable candidate reference sections have been stored, then the number is again tested. If enough acceptable candidate reference sections remain, e.g., twenty-five, the enrollment procedure continues, as indicated on FIG. 7B. At this point, several candidate reference sections 98 remain under consideration, as shown in FIG. 8. The most unique candidate reference section, namely, the candidate reference section with the lowest autocorrelation score, will be referred to herein as the primary candidate reference section, and all other candidate reference sections as secondary candidate reference sections.

The enrollment procedure up to this point has been concerned with selecting unique reference sections of the first reference fingerprint image. The next step is to investigate the repeatability of those candidate reference sections selected from the first reference fingerprint image by looking at additional reference fingerprint images. Accordingly, the individual seeking enrollment is instructed to present the same finger so that another reference fingerprint image can be obtained. Once the second reference fingerprint image is captured, the image data is filtered and binarized, this time by the filter and binarizer circuits 62 and 64. Preferably, the filter 62 and binarizer 64 perform their respective operations on the incoming image data in the same manner in which the programmed computer 50 filters and binarizes the first reference fingerprint image internally during the first portion of the enrollment procedure. Next, the primary candidate reference section is retrieved from memory and is used to align the secondary candidate reference sections with the second reference fingerprint image 100 (FIG. 8). At this point, a search is performed to find the best-match location for the primary candidate reference section 102 within a search area 104. The search area is centered at the coordinates of the primary candidate reference section 102 as determined from the first reference fingerprint image. The size of the search area 104 is large enough to accommodate a certain amount of misregistration of the finger 22 with respect to the optical element 20. Correlation calculations are performed throughout the search area and the best-match location of the primary candidate reference section 102 within the search area 104 defines an alignment correction to be applied to locating the secondary candidate reference sections.

Preferably, the best-match location is determined by a two-step process utilizing first a coarse grid, and then utilizing a fine grid. Initially, the entire search area is covered, computing correlation values at, for example, every third location. Then, the correlation calculation is performed for every location surrounding the few best locations found initially. The time for finding the best-match location is thus reduced.

As shown in FIG. 8, the second reference fingerprint image 100 is fairly well aligned with the first reference fingerprint image 80, and, as a result, the best-match location for the primary candidate reference section 102 is in the middle of the search area 104. The third reference fingerprint image 106, however, is shifted slightly to the right with respect to the first reference fingerprint image 80, and, as a result, the best-match location for the primary candidate reference section 102 is also shifted slightly toward the right side of the search area 104. The fourth reference fingerprint image 108 is shifted slightly downward with respect to the first reference fingerprint image 80, thus, the best-match location for the primary candidate reference section 102 is also shifted downward.

Once the best-match location and its corresponding correlation value for the primary candidate reference section is determined, all of the secondary candidate reference sections are matched to the reference fingerprint image. Each search area 106 for the secondary candidate reference sections 108 is located relative to the best-match location of the primary candidate reference section 102 according to the known relative position between the secondary candidate reference section and the primary candidate reference section. Thus, the alignment correction determined by the primary candidate reference section is used to center the search areas for the secondary candidate reference sections near the expected best-match locations. The search areas for the secondary candidate reference sections can be smaller in size than the search area for the primary candidate reference section as a result of the alignment correction. In the preferred embodiment, for example, the search area for the primary candidate reference section is 160 by 192 pixels, while the search areas for the secondary candidate reference sections are 64 by 64 pixels. For each secondary candidate reference section, a correlation value is computed at its best-match location within its corresponding search area, and that value is stored for later use.

Once the best-match locations and corresponding best correlation values have been computed for all candidate reference sections, another reference fingerprint image is obtained from the individual seeking enrollment, and the correlation loop is repeated. After the correlation loop has been completed for all of the additional reference fingerprint images, totalling three in the example shown in FIG. 8, an evaluation is performed on the candidate reference sections. Each candidate reference section is ranked according to the mean of its best correlation values as determined by the above redetection process. If, for example, three reference fingerprint images are obtained in addition to the initial reference fingerprint image, then each candidate reference section would have three corresponding best correlation values to be averaged. The highest ranked candidate reference sections at this point are then selected as the reference sections 109 for inclusion into the template that represents the culmination of the enrollment procedure. In the preferred embodiment, the nine highest ranked candidate reference sections 109 comprise the template. The reference section with the highest redetection score, referred to hereinafter as the primary reference section, will be utilized during the verification procedure in much the same manner as the primary candidate reference section is utilized in the redetection process.

Figure 13:
FIG. 13 is a schematic illustration of an exemplary reference fingerprint image, including selected reference sections.
Figure 15:
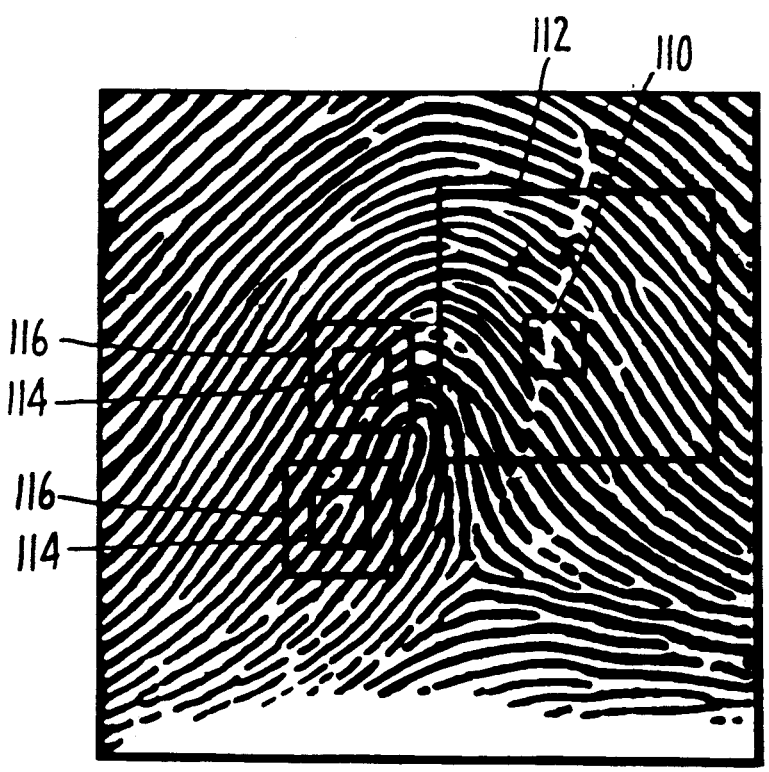
FIG. 15 is a schematic illustration of a fingerprint image to which a primary reference section and two secondary reference sections are aligned.
Figure 14:
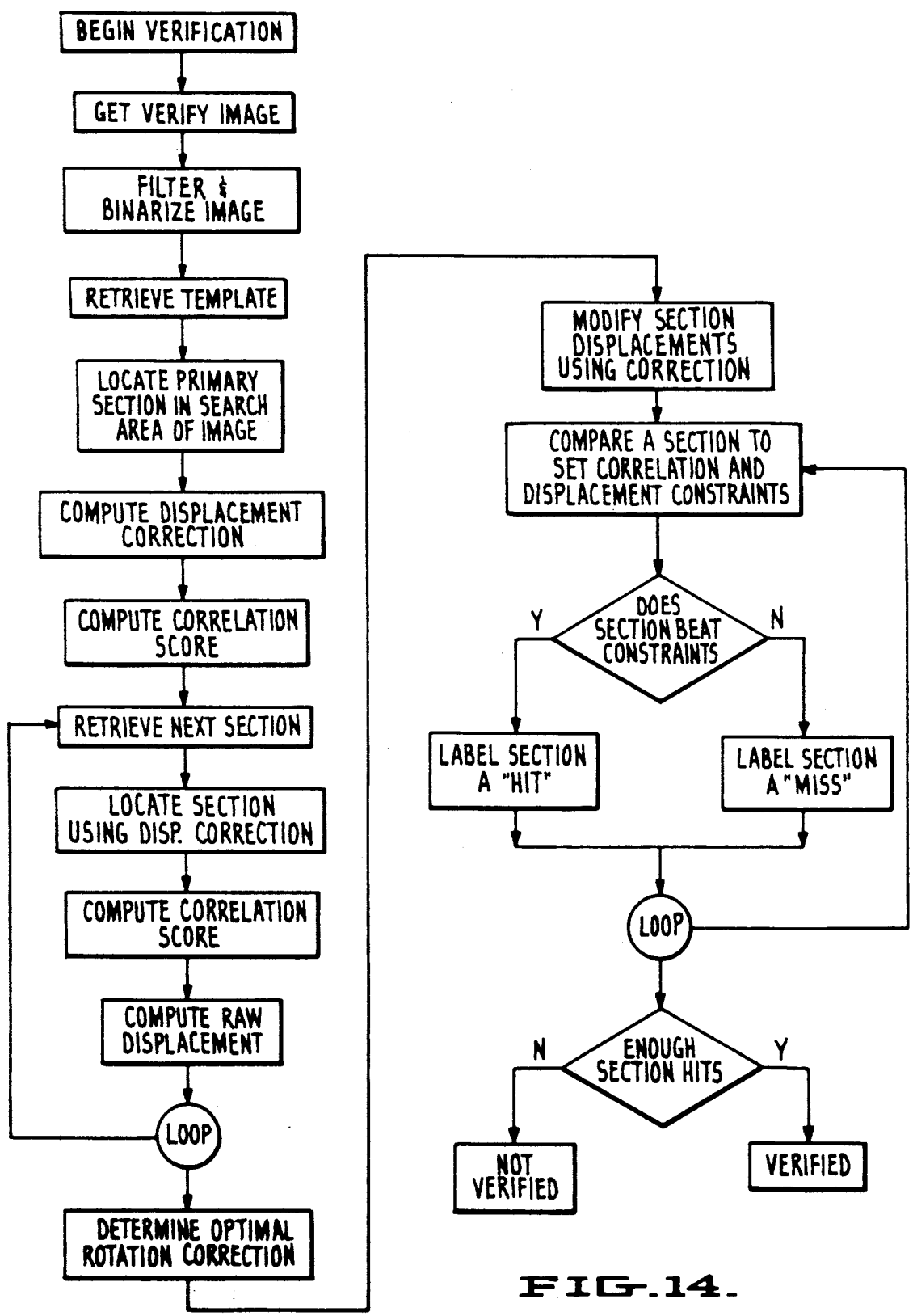
FIG. 14 is a detailed flow chart of a verification procedure of the fingerprint verification method.

One additional test is performed to make sure that the correlation values are at least equal to a predetermined minimum value. This test ensures that the enrollee does not switch fingers after the initial reference fingerprint image is obtained. At this point, the selected reference sections should be fairly redetectible, so that a threshold of perhaps 80% average correlation would be reasonable to use. Once this test is passed, the trinarized image data of the selected reference sections along with data characterizing their relative positions is then stored in a non-volatile memory for later use in the verification procedure. FIG. 13 illustrates an exemplary fingerprint image with nine reference sections that form the template for that fingerprint.

The above-described enrollment procedure thus selects based on a wide coverage and unbiased location, a set of locally unique reference sections for characterizing the fingerprint of the enrollee. These reference sections are also repeatable, as assured by the relocation routine, which simulates the actual verification procedure described below.

Now that the individual is enrolled, he can at a later time seek access by participating in the verification procedure of the present invention. The verification procedure, illustrated in FIG. 14, begins with the individual identifying himself to the terminal by way of a name or personal identification number, or perhaps by inserting a smart card containing the stored template data into the smart card interface device 70. Based on the individual's claimed identity, the terminal retrieves the template data for use in verification. The individual then places his finger 22 on the optical element 20 of the fingerprint verification terminal 10 and instructs the terminal to verify his identity. The computer 50 commands the imaging device 52 to obtain a verify fingerprint image of the individual seeking verification. The verify fingerprint image is filtered and binarized by the filter and binarizer circuits 62 and 64 prior to arrival at the computer 50.

Once the computer 50 has obtained the verify fingerprint image and retrieved the template data, the template is aligned with respect to the verify fingerprint image to cancel out translational misalignment of the individual's finger in the imaging device. In order to align the template to the verify fingerprint image, the primary reference section 110 (FIG. 15) is first located on the verify fingerprint image by determining the best-match location within a relatively wide search region 112 at which the correlation between the primary reference section and the underlying verify fingerprint image is the greatest. As described above, the best-match location is determined using the trinarized ridge and valley section image data of the primary reference section and the binarized image data of the verify fingerprint image, using the above disclosed formula for correlation value, and, preferably, using a coarse/fine grid locate routine, as described above.

Once the best-match location of the primary reference section has been determined, the remaining reference sections of the template are then located on the verify fingerprint image. A two-dimensional alignment correction is determined and is used in locating the search regions for the remaining reference sections. For each of the remaining reference sections 114, a verify region 116 is defined centered at the expected position of the reference section relative to the position of the primary reference section. The verify region is larger in extent than its corresponding reference section to allow for rotational misalignment and dimensional changes to the finger due to swelling and shrinkage. A best-match location is determined within the verify region surrounding the registered position of the reference section. The best-match location is defined as that location within the verify region at which the correlation value between the trinarized image data of the reference section and the binarized image data of the verify fingerprint image is the highest. The best-match location of each reference section may occur at the center of the verify region, or may occur at a location displaced therefrom. For each reference section, two values are stored: the correlation value calculated at the best-match location, and the displacement of the best-match location from the expected position of the reference section.

Once all of the reference sections of the template have been matched to the verify fingerprint image, a rotational correction is performed to cancel out rotational misalignment of the verify fingerprint image relative to the reference fingerprint image obtained during the enrollment procedure. Preferably, a least squares fit routine is executed to determine a rotation of the reference sections that results in a minimized set of displacements from their expected locations.

The rotational correction process is illustrated in FIG. 16. A primary reference section 120 has been located within its search region and the verify regions 124 of the remaining reference sections 122 have been defined. If the verify fingerprint image happens to be perfectly aligned with the reference fingerprint image, then no rotational correction is needed, and the best-match locations for the reference sections 122 would be located as shown in FIG. 16A. On the other hand, if the verify fingerprint image is rotated with respect to the reference fingerprint image, then a rotational correction is needed, as shown in FIG. 16B. Even though all of the reference sections 122 of FIG. 16B are shifted from their expected positions at the centers of their respective verify regions 124, the rotational correction would cancel out the apparent misalignment.

While FIGS. 16A and 16B assume that the person seeking verification is the same as the person who enrolled, FIG. 16C illustrates the expected result from an impostor. Once the primary reference section 120 is located at its best-match location, the remaining reference sections 122 are located at their respective best-match locations. Since the person verify fingerprint image is from an impostor, the best-match locations of the reference sections 122 will occur at random displacements from the expected locations in the centers of the verify regions 124. In this case, the rotational correction would not significantly reduce the accumulated displacement errors.

Once all of the reference sections have been located and rotationally corrected and their correlation values have been computed, an evaluation of the correlation values and corrected displacements is then performed to determine whether to verify or reject the person seeking access as the enrolled person. Each reference section is classified as a "hit" or a "miss" according to its correlation value and corrected displacement. A relatively high correlation value and a relatively low displacement are required in order for that reference section to be classified as a hit. If the person seeking verification is the same as the enrollee, then high correlation values and low displacements would be expected. On the other hand, if the person seeking verification is an impostor, low correlation values and relatively high displacement would be expected. A shown in FIG. 17, a line 126 can be established as a function of the correlation value and corrected displacement to define misses above the line and hits below the line. Preferably, if the number of hits exceeds a predetermined threshold, such as one half of the number of reference sections in the template, then the verification is successful, if not, then the person is rejected.

As shown in FIG. 17, there may be a slight overlap between the envelope of true cases and the envelope of impostors. If type 2 errors are to be avoided at all costs (false verifications) then the line 126 can be lowered to a point outside the impostor envelope by tightening up on the required correlation and displacement values for a "hit" or by increasing the percentage of hits required to verify. By proper selection of the hit-miss criteria, the method of the present invention can reduce the type 2 errors to approximately zero. Type 1 errors (false rejections) can be minimized by proper placement of fingers in the fingerprint verification terminal 10 by the users thereof. Note that the envelopes of FIG. 17 do not indicate the probability distribution of the true case, which are heavily weighted toward high correlation and low displacements. It is unlikely that a majority of the reference sections of a true case would occur in the overlap area.

One alternative to the above described routine for the determination of the best-match location of the primary reference section involves the use of an expandable search area in order to speed up the verification process for those individuals who accurately position their fingers in the fingerprint verification terminal 10. According to this alternative, the best-match search is first performed within a substantially reduced area surrounding the expected position of the primary reference section. If within this reduced area a very high correlation value is calculated, then that location is assumed to be the best-match location without searching the entire search region. If the best correlation value is not high enough then the search area can be expanded in stages until the best-match location is found. The advantage of this alternative is that it rewards accurate finger placement by speeding up the verification process.

Other alternatives exist that depart in various ways from the above described preferred embodiment. For example, instead of fixing the reference sections on a fixed grid, locally better reference sections could be obtaining by examining the regions surrounding reference sections determined from a fixed grid. In the selection of the number of reference sections utilized, there are trade-offs between higher accuracy with an increased number verses increased computational time. Another alternative is to rotationally correct based on a subset of the reference sections, so that any one or a few poorly located reference sections would not pollute the correction. Also, the image data of the reference sections could be binarized, while the image data of the reference and verify fingerprint images could be trinarized. In addition, other correlation formulas for the measurement of the comparison between two data sets could be utilized.

From the above description, it will be apparent that the invention disclosed herein provides a novel and advantageous method and apparatus for the verification of object identity by image correlation, and more specifically provides a method and apparatus for verification of personnel identity by correlation of fingerprint images. The foregoing discussion discloses and describes merely exemplary methods and embodiments of the present invention. As will be understood by those familiar with the art, the invention may be embodied in other specific forms without departing from the spirit or essential characteristics thereof. For example, the object identification method could be used to identify objects other than fingerprints. Accordingly, the disclosure of the present invention is intended to be illustrative, but not limiting, of the scope of the invention, which is set forth in the following claims.

What is claimed is:

1. An image correlation method for verifying the identity of an object, said method comprising the steps of:

forming a two-dimensional reference image of a reference object;

identifying a plurality of two-dimensional reference sections from said reference image by the steps of partitioning said reference image into a plurality of two-dimensional candidate reference sections from which said reference sections will be selected, performing an autocorrelation calculation for each candidate reference section to determine the degree of distinctiveness of said candidate reference section relative to a two-dimensional local region of said reference section by comparing pixels of the two-dimensional image data of said candidate reference section to corresponding pixels of the two-dimensional image data of equal-sized areas throughout said local region, wherein said local region is larger than said candidate reference section and smaller than said reference image, and selecting said reference sections from the most distinctive of said candidate reference sections based on the results of the autocorrelation calculations; and then forming a two-dimensional verify image of an object whose identity is to be verified, wherein said verify image includes a plurality of two-dimensional verify regions each corresponding in position to one of said reference sections and each larger in extent than its corresponding reference section;

determining a best-match location within each verify region at which the image data is most similar to the image data of its corresponding reference section;

determining the relative positioning of said best-match locations relative to each other and comparing that positioning to the relative positioning of the reference sections relative to each other; and verifying the identity of said object according to the degree of similarity between the image data of said best-match locations and said corresponding reference sections, and according to the degree of similarity between the relative positioning of said best-match locations and the relative positioning of said corresponding reference sections.

2. A method as recited in claim 1 wherein said step of forming a two-dimensional reference image of a reference object includes the steps of first forming a two-dimensional image consisting of grey pixels having a plurality of brightness values on a grey scale ranging between black and white, and then converting said grey pixels into binary pixels having brightness values of black or white.

3. A method as recited in claim 2 wherein said step of converting said grey pixels into binary pixels includes the steps of first determining a local median grey value of a subfield of said reference image, and then converting each grey pixel within said subfield into a binary pixel according to its grey scale brightness value relative to said median grey value.

4. A method as recited in claim 1 wherein said step of performing an autocorrelation calculation for each candidate reference section includes the steps of computing a plurality of correlation values, wherein each correlation value is based on a comparison of the image data of said candidate reference section with the image data of an equal-sized area of said local region, and computing an autocorrelation score based on the highest correlation value computed within said local region but outside of a region near the location of said candidate reference section, wherein a high autocorrelation score indicates a locally non-distinct candidate reference section.

5. A method as recited in claim 4 wherein said step of computing a correlation value includes the step of a pixel-by-pixel comparison between the image data of said candidate reference section and the image data of said equal-sized area of said local region.

6. A method as recited in claim 4 wherein said step of forming a reference image of a reference object includes the step of forming an image consisting of grey pixels having a plurality of brightness values on a grey scale ranging between black and white, and calculation includes the step of converting the grey pixels of said candidate reference section and of said local region into binary pixels having brightness values of black or white prior to performing said step of computing correlation values.

7. A method as recited in claim 6 wherein said step of converting the grey pixels of said local region into binary pixels includes the steps of first determining a median grey value within said local region, and then converting each grey pixel of said local region into a binary pixel according to its grey scale brightness value relative to said median grey value.

8. A method as recited in claim 6 wherein said step of converting the grey pixels of said candidate reference section into binary pixels includes the step of trinarizing the image data of said candidate reference section by first determining a black-grey threshold value and a grey-white threshold value based on the distribution of grey scale brightness values within said candidate reference section, and then converting the grey scale pixels of said candidate reference section into black, grey, and white pixels according to their grey scale brightness values relative to said black-grey and grey-white threshold values.

9. A method as recited in claim 8 wherein said step of computing a correlation value includes the step of comparing the black pixels and white pixels of said candidate reference section to the black pixels and white pixels of said local region, adding the number of matches between black or white pixels of said candidate reference section and black or white pixels of said local region, and dividing by the number of black and white pixels of said candidate reference section, wherein the resulting value equals said correlation value.

10. A method as recited in claim 8 wherein said black-grey and grey-white threshold values are selected such that about one third of the grey scale pixels of said candidate reference section are converted into black pixels and about one third of the grey scale pixels of said candidate reference section are converted into white pixels.

11. A method as recited in claim 1 wherein said step of partitioning said reference image defines a plurality of candidate reference sections that overlap adjacent candidate reference sections, and wherein said step of selecting said reference sections from the most distinctive of said candidate reference sections includes the step of rejecting candidate reference sections that substantially overlap adjacent candidate reference sections having higher degrees of local distinctiveness.

12. A method as recited in claim 1 wherein said step of forming a two-dimensional reference image of a reference object includes the step of forming an image consisting of grey pixels having a plurality of brightness values on a grey scale ranging between black and white, and wherein said method further comprises the step of rejecting certain candidate reference sections based on the grey scale values of the pixels within said candidate reference sections.

13. A method as recited in claim 12 wherein said step of rejecting candidate reference sections includes the step of rejecting a candidate reference section based on the median grey value within said candidate reference section.

14. A method as recited in claim 13 wherein said step of rejecting candidate reference sections includes the step of rejecting a candidate reference section if said candidate reference section is adjacent to a candidate reference section that has been rejected based on its median grey value.

15. A method as recited in claim 12 wherein said step of rejecting candidate reference sections includes the steps of first determining a black-grey threshold value and a grey-white threshold value based on the distribution of grey scale brightness values within a candidate reference section, wherein substantially one-third of the pixels of said candidate reference sections are darker than said black-grey threshold and substantially one-third of the pixels are lighter than said grey-white threshold, and then rejecting said candidate reference section based on the difference in values of said black-grey and grey-white thresholds.

16. A method as recited in claim 1 wherein said step of selecting said reference sections from the most distinctive of said candidate reference sections includes the steps of: selecting a number of the most distinctive of said candidate reference sections based on the results of the autocorrelation calculations, measuring the redetectability of each of the remaining candidate reference sections with respect to one or more subsequent two-dimensional images of said reference object, and selecting said reference sections according to said degree of similarity between the image data of said remaining candidate reference sections and the image data of said one or more subsequent images.

17. A method as recited in claim 16 wherein said step of measuring the redetectability of each of the remaining candidate reference sections includes the steps of forming one or more subsequent two-dimensional images of said reference object and determining the degree of similarity between the two-dimensional image data of each of the remaining candidate reference sections and the two-dimensional image data of said one or more subsequent images.

18. A method as recited in claim 17 wherein said step of determining the degree of similarity between the image data of each of the remaining candidate reference sections and the image data of said one or more subsequent images includes for each of said subsequent images the step of determining best-match locations for said remaining candidate reference sections within corresponding search areas of said subsequent image, wherein each search area is a two-dimensional region of said subsequent image that surrounds the expected location of a corresponding candidate reference section, wherein each best-match location is the location within a search area at which the correlation is highest between the image data of a corresponding candidate reference section and the image data of the subsequent image, and wherein the correlation value computed at each best-match location is a measure of said degree of similarity.

19. A method as recited in claim 18 wherein said step of determining best-match locations for said remaining candidate reference sections within corresponding search areas of said subsequent image includes the steps of first determining the best-match locations of one of said remaining candidate reference sections within a first search region of said subsequent image, wherein the deviation of the best-match location of said one candidate reference section from the expected location thereof defines a positional error of said subsequent image with respect to said reference image, and then determining the best-match locations of the rest of said remaining candidate reference sections with respect to said subsequent image by searching within second search regions for best-match locations, wherein said second search regions are located with reference to said positional error, and wherein said second search regions are smaller in size than said first search region.

20. A method as recited in claim 19 wherein said step of selecting said reference sections from the remaining candidate reference sections according to said degree of similarity between the image data of said reference sections and the image data of said one or more subsequent images includes the steps of sorting said remaining candidate reference sections according to the average of the correlation values computed at the best-match locations for each of said subsequent images, and then selecting a number of the highest ranked candidate reference sections as said reference sections.

21. A method as recited in claim 1 further comprising the step of storing the two-dimensional image and relative positioning data of each of said reference sections after said step of identifying a plurality of reference sections for later use in verifying the identity of objects.

22. A method as recited in claim 1 wherein said step of forming a two-dimensional verify image includes the steps of first forming an image consisting of grey pixels having a plurality of brightness values on a grey scale ranging between black and white, and then converting said grey pixels into binary pixels having brightness values of black or white based on the median grey value of neighboring pixels.

23. A method as recited in claim 1 wherein said step of determining a best-match location within each verify region includes the steps of first determining the best-match location of one of said reference sections within a first verify region of said verify image, wherein the deviation of the best-match location of said one reference section from the expected location thereof defines a positional error of said verify image with respect to said reference image, and then determining the best-match locations of the rest of said reference sections with respect to said verify image by searching within second verify regions for best-match locations, wherein said second verify regions are located with reference to said positional error.

24. A method as recited in claim 23 wherein said second verify regions are smaller in size than said first verify region.

25. A method as recited in claim 23 wherein said step of first determining the best-match location of said one of said reference sections within said first verify region includes the steps of finding the highest correlation value within a subfield of said first verify region and specifying the best-match location as the location within said subfield at which said correlation value is highest if said highest correlation value exceeds a predetermined value, and if not, finding the highest correlation value with the entire first verify region and specifying the best-match location as that location within the entire first verify region at which the correlation value is highest, wherein each correlation value is a measure of the similarity between the image data of said one reference section and the image data of an equal-sized area of said first verify region.

26. A method as recited in claim 25 wherein said subfield is located within said first verify region at a location surrounding the expected location of said one reference section.

27. A method as recited in claim 1 wherein said step of determining a best-match location includes the steps of computing correlation values throughout said verify region, wherein each correlation value is a measure of the similarity between the image data of a reference section and the image data of an equal-sized area of the corresponding verify region, and specifying the best-match location as that location within said verify region at which the correlation value is highest.

28. A method as recited in claim 27 wherein said step of computing a correlation value includes the step of comparing pixel-by-pixel the image data of said reference section and the image data of an equal-sized area of said verify region.

29. A method as recited in claim 27 wherein said step of determining a best-match location includes the steps of first computing correlation values at selected locations distributed throughout said verify region and then computing correlation values at all possible locations near those locations where high correlation values were found.

30. A method as recited in claim 1 wherein said step of forming a two-dimensional reference image of a reference object includes the step of forming an image consisting of grey pixels having a plurality of brightness values on a grey scale ranging between black and white, wherein said step of identifying a plurality of reference sections includes the step of converting the grey pixels of each reference section into binary pixels having brightness values of black or white based on the median grey value of pixels within said reference section, wherein said step of forming a two-dimensional verify image includes the steps of first forming an image consisting of grey pixels having a plurality of brightness values on a grey scale ranging between black and white, and then converting said grey pixels into binary pixels having brightness values of black or white based on the median grey value of pixels within said verify image, and wherein said step of determining a best-match location within each verify region includes the steps of computing correlation values throughout said verify region, wherein each correlation value is computed by a pixel-by-pixel comparison between the binary image data of said reference section and the binary image data of an equal-sized area of said verify region, and specifying the best-match location as that location within said verify region where the correlation value is highest.

31. A method as recited in claim 30 wherein said step of converting the grey pixels of each reference section into binary pixels includes the step of trinarizing the image data of a reference section by first determining a black-grey threshold value and a grey-white threshold value based on the distribution of grey scale brightness values within said reference section, and then converting the grey scale pixels of said reference section into black, grey, and white pixels according to their grey scale brightness values relative to said black-grey and grey-white threshold values.

32. A method as recited in claim 31 wherein said step of computing a correlation value includes the step of comparing the black pixels and white pixels of said reference section to the black pixels and white pixels of said verify region, adding the number of matches between black or white pixels of said reference section and black or white pixels of said verify region, and dividing by the number of black and white pixels of said reference section, wherein the resulting value equals said correlation value.

33. A method as recited in claim 1 wherein said step of determining a best-match location includes the steps of computing correlation values throughout said verify region, wherein each correlation value is a measure of the similarity between the image data of a reference section and the image data of an equal-sized area of the corresponding verify region, and specifying the best-match location as that location within said verify region where the correlation value is highest, and wherein said step of verifying the identity of said object includes the steps of first determining a displacement value for each of said reference sections, wherein each displacement value relates to the distance between the location of a reference segment within said reference image and the location of the corresponding best-match location within said verify image, and verifying that said object has the same identity as said reference object based on high correlation values and low displacement values.

34. A method as recited in claim 33 wherein said step of verifying the identity of said object includes the step of adjusting said displacement values by rotating the best-match locations of the reference sections around an origin at the best-match location of one of said reference sections to correct for translational and rotational misalignment of said verify image with respect to said reference image.

35. A method as recited in claim 33 wherein said step of verifying the identity of said object includes the step of establishing a functional expression utilizing correlation values and displacement values so that each reference section can be classified as tending to verify or not depending on its corresponding correlation and displacement values relative to said functional expression, and wherein the identity of said object will be verified only when a predetermined number of said reference sections tend to verify object identity.

36. A method as recited in claim 35 wherein the identity of said object will be verified if a majority of said reference sections tend to verify.

37. A fingerprint verification method for verifying the identity of a person as recited in claim 1 wherein said step of forming a reference image of a reference object includes the step of forming an image of a fingerprint of a person seeking enrollment, and wherein said step of forming a verify image of an object whose identity is to be verified includes the step of forming an image of a fingerprint of a person seeking verification.

38. A fingerprint verification method for verifying the identity of a person by comparing presently obtained fingerprint data with previously obtained fingerprint data, said method comprising the steps of:

first enrolling one or more persons by the steps of forming a two-dimensional reference image of a fingerprint of each enrolling person, identifying a plurality of reference sections from each reference image by partitioning said reference image into a plurality of two-dimensional candidate reference sections from which said reference sections will be selected, performing an autocorrelation calculation for each candidate reference section to determine the degree of distinctiveness of said candidate reference section relative to a two-dimensional local region of reference section by comparing pixels of the two-dimensional image data of said candidate reference section to corresponding pixels of the two-dimensional image data of equal-sized areas throughout said local region, wherein said local region is larger than said candidate reference section and smaller than said reference image, and selecting said reference sections from the most distinctive of said candidate reference sections based on the results f the autocorrelation calculations, and saving the two-dimensional image and relative positioning data of each of said reference sections as fingerprint data for the enrolling person; and then verifying the identify of someone claiming to be an enrolled person by the steps of retrieving the two-dimensional image and relative positioning data of the reference sections of the enrolled person, forming a two-dimensional verify image of the fingerprint of the person claiming to be enrolled, wherein said verify image includes a plurality of two-dimensional verify regions each corresponding in position to one of said reference sections and each larger in extent than its corresponding reference section, determining a best-match location within each verify region at which the image data is most similar to the image data of its corresponding reference section, and verifying the identity of the person claiming to be enrolled according to the degree of similarity between the two-dimensional image data of said best-match locations and said corresponding reference sections and according to the degree of similarity between the relative positioning of said best-match locations and said corresponding reference sections.

39. A fingerprint verification method for verifying the identity of a person by comparing presently obtained fingerprint data with previously obtained fingerprint data, said method comprising the steps of:

first enrolling one or more persons according to the steps of:

forming a two-dimensional reference image of a fingerprint of a person seeking enrollment, partitioning said reference image into a plurality of two-dimensional candidate reference sections, determining the degree of distinctiveness of each candidate reference section within a two-dimensional local region surrounding said candidate reference section by comparing pixels of the two-dimensional image data of said candidate reference section to corresponding pixels of the two-dimensional image data of equal-sized areas throughout said local region, wherein said local region is larger than said candidate reference section and smaller than said reference image, determining the redetectability of each candidate reference section with respect to one or more subsequent images of the fingerprint of the person seeking enrollment by determining the degree of similarity between the image data of said candidate reference section and the image data of said one or more subsequent images, selecting a group of reference sections from said candidate reference sections according to the degree of distinctiveness and the degree of redetectability of said candidate reference sections, and saving the two-dimensional image and relative positioning data of each of the selected reference sections as fingerprint data for later use in verifying the identity of a person seeking verification;

and later verifying the identity of a person seeking verification according to the steps of:

obtaining an indication of which previously enrolled person that the person seeking verification claims to be, retrieving the two-dimensional image and relative positioning data of the reference sections of the previously enrolled person, forming a two-dimensional verify image of the fingerprint of the person seeking verification, wherein said verify image includes a plurality of two-dimensional verify regions each corresponding in relative position to and each larger in extend that a corresponding one of said reference sections, determining the best-match locations of said reference sections within their corresponding verify regions, wherein each best-match location is that location within a verify region at which the image data is most similar to the image data of the corresponding reference section, determining a displacement value for each of said reference sections, wherein each displacement value is a measure of the distance between the position of the best-match location and the expected position thereof, adjusting one or more of said displacement values to correct for misalignment of said verify image with respect to said reference image, classifying each reference section as tending to verify or not based on its corresponding correlation and displacement values, and verifying the identity of the person seeking verification if at least a predetermined number of said reference sections are classified as tending to verify.

40. A fingerprint verification method for verifying the identity of a person by comparing presently obtained fingerprint data with previously obtained fingerprint data, said method comprising the steps of:

first enrolling one or more persons according to the steps of:

forming a two-dimensional reference image of a fingerprint of a person seeking enrollment, wherein said reference image consists of grey pixels having a plurality of brightness values on a grey scale ranging between black and white, partitioning said reference image into a plurality of two-dimensional candidate reference sections from which a set of reference sections will be selected, rejecting certain candidate reference sections based on the grey scale values of the pixels within said candidate reference sections, performing an autocorrelation calculation for each remaining candidate reference section to determine the degree of distinctiveness of said candidate reference section within a local region surrounding said candidate reference section, wherein said autocorrelation calculation includes the steps of computing a plurality of correlation values throughout said local region, wherein each correlation values throughout said local region, wherein each correlation value is a measure of the similarity between the image data of said candidate reference section with the image data of an equal-sized area of said local region, and computing an autocorrelation score based on the highest correlation value computed within said local region but outside of a region near the location of said candidate reference section, wherein a high autocorrelation score indicates a locally non-distinct candidate reference section, selecting a number of the most distinctive of said candidate reference sections based on the results of the autocorrelation calculations, measuring the redetectability of each of the remaining candidate reference sections with respect to one or more subsequent two-dimensional images of the fingerprint of the person seeking enrollment by determining the degree of similarity between the image data of said remaining candidate reference sections and the image data of said one or more subsequent images, selecting a template of reference sections from the set of remaining candidate reference sections according to said redetectability of said remaining candidate reference sections with respect to said one or more subsequent images, and saving the two-dimensional image and relative positioning data of each of the selected reference sections as fingerprint data for later use in verifying the identity of a person seeking verification;

and later verifying the identity of a person seeking verification according to the steps of:

obtaining from the person seeking verification an indication of which previously enrolled person that the person seeking verification claims to be, retrieving the two-dimensional image and relative positioning data of the reference sections of the previously enrolled person, forming a two-dimensional verify image of the fingerprint of the person seeking verification, wherein said verify image includes a plurality of two-dimensional verify regions each corresponding in relative position to and each larger in extent than a corresponding one of said reference sections, determining the best-match locations of said reference sections within corresponding verify regions of said verify image, wherein each best-match location is that location within a verify region at which the image data is most similar to the image data of the corresponding reference section, wherein said best-match location is determined by the steps of computing correlation values throughout said verify region, wherein each correlation value is a measure of the similarity between the image data of said corresponding reference section and the image data of an equal-sized area of said verify region, and specifying the best-match location as that location within said verify region where the correlation value is highest, determining a displacement value for each of said reference sections, wherein each displacement value is a measure of the distance between the position of the best-match location and the expected position thereof, adjusting one or more of said displacement values to correct for misalignment of said verify image with respect to said reference image, classifying each reference section as tending to verify or not based on its corresponding correlation and displacement values, and verifying the identity of the person seeking verification if at least a predetermined number of said reference sections are classified as tending to verify.

41. A method as recited in claim 40 wherein said step of a performing an autocorrelation calculation includes the steps of converting the grey pixels of said local region into binary pixels having brightness values of black or white and converting the grey scale pixels of said candidate reference section into trinary pixels having brightness values of black, grey, or white, and wherein said step of computing correlation values throughout said local region disregards the grey trinary pixels of said candidate reference sections.

42. A method as recited in claim 41 wherein each computation of a correlation value within said local region includes the step of comparing the black pixels and white pixels of said candidate reference section to the black pixels and white pixels of said local region, adding the number of matches between black or white pixels of said candidate reference section and respective black or white pixels of said local region, and dividing by the number of black pixels and white pixels of said candidate reference section, wherein the resulting value equals said correlation value.

43. A method as recited in claim 40 wherein said method further includes the step of converting the grey scale pixels of said reference sections into trinary pixels having brightness values of black, grey, or white, wherein said step of forming a verify image includes the step of forming an image with binary pixels having brightness values of black or white, and wherein said step of computing correlation values throughout each verify region disregards the grey trinary pixels of said reference sections.

44. A method as recited in claim 43 wherein each computation of a correlation value within said verify region includes the step of comparing the black pixels and white pixels of said reference section to the black pixels and white pixels of said verify region, adding the number of matches between black or white pixels of said reference section and respective black or white pixels of said verify region, and dividing by the number of black pixels and white pixels of said reference section, wherein the resulting value equals said correlation value.

45. A method as recited in claim 40 wherein said step of determining the best-match locations of said reference sections within respective verify regions of said verify image includes the steps of determining a first best-match location of one of said reference sections within a corresponding first verify region of said verify image, and then locating the rest of said verify regions relative to said first best-match location, and then determining the best-match locations of the rest of said reference sections.

46. A method as recited in claim 45 wherein said step of adjusting said displacement values to correct for misalignment of said verify image includes the step of adjusting for rotational misalignment of said verify image by finding a rotated position of said template of reference sections with respect to said verify image at which sum of the squares of the displacement values is minimized.

47. A fingerprint verification method for verifying the identity of a person by comparing presently obtained fingerprint data with previously obtained fingerprint data, said method comprising the steps of:

first enrolling one or more persons according to the steps of:

forming a reference image of the ridges and valleys of a fingerprint of a person seeking enrollment, wherein said reference image consists of grey pixels having a plurality of brightness values on a grey scale ranging between black and white, and wherein said fingerprint ridges and valleys are represented by brightness values tending toward black or white, partitioning said reference image into a plurality of candidate reference sections from which a set of reference sections will be selected, rejecting certain candidate reference sections based on the grey scale values of the pixels within said candidate reference sections, performing an autocorrelation calculation for each remaining candidate reference section to determine the degree of distinctiveness of said candidate reference section within a local region surrounding said candidate reference section, wherein said autocorrelation calculation includes the steps of converting the grey pixels of said local region into binary pixels having brightness values of black or white, converting the grey scale pixels of said candidate reference section into trinary pixels having brightness values of black, grey, or white, computing a plurality of correlation values throughout said local region, wherein each correlation value is a measure of the similarity between the black and white trinary pixels of said candidate reference section with the black and white binary pixels of an equal-sized area of said local region, and computing an autocorrelation score based on the highest correlation value computed within said local region but outside of a region near the location of said candidate reference section, wherein a high autocorrelation score indicates a locally non-distinct candidate reference section;

selecting a number of the most distinctive of said candidate reference sections based on the results of the autocorrelation calculations, measuring the redetectability of each of the remaining candidate reference sections with respect to one or more subsequent images of the finger print of the person seeking enrollment by determining the degree of similarity between the image data of said remaining candidate reference sections and the image data of said one or more subsequent images, selecting a template of reference sections from the set of remaining candidate reference sections according to said redetectability of said remaining candidate reference sections with respect to said one or more subsequent images, wherein the image data contained in each of said reference sections is locally unique, and saving the image and relative positioning data of each of the selected reference sections as fingerprint data for later use in verifying the identity of a person seeking verification;

and later verifying the identity of a person seeking verification according to the steps of:

obtaining from the person seeking verification an indication of which previously enrolled person that the person seeking verification claims to be, retrieving the image and relative positioning data of the reference sections of the previously enrolled person, forming a verify image of the ridges and valleys of the fingerprint of the person seeking verification, wherein said verify image includes binary pixels having brightness values of black or white to indicate said ridges and valleys, and wherein said verify image includes a plurality of verify regions each corresponding in relative position to and each larger in extent than a corresponding one of said reference sections, determining a first best-match location of one of said reference sections within a first verify region of said verify image, wherein each best-match location is that location within a verify region at which the image data is most similar to the image data of the corresponding reference section, wherein each best-match location is determined by the steps of computing correlation values throughout the verify region and specifying the first best-match location as that location within the verify region where the correlation value is highest, wherein each correlation value is a measure of the similarity between the black and white pixels of the reference section and the black and white pixels of an equal-sized area of the corresponding verify region, and then locating the rest of said verify regions relative to said first best-match location, and then determining the best-match locations of the rest of said reference sections with respect to said verify image by searching within the rest of said verify regions for best-match locations, determining a displacement value for each of said reference sections, wherein each displacement value is a measure of the distance between the position of the best-match location and the expected position thereof, adjusting one or more of said displacement values to correct for rotational misalignment of said verify image with respect to said reference image, classifying each reference section as tending to verify or not depending on its corresponding correlation and displacement values, and verifying the identity of the person seeking verification if at least a predetermined number of said reference sections are classified as tending to verify.

48. An apparatus for verifying the identify of a person by comparing a two-dimensional image of that person's fingerprint to reference data derived from a two-dimensional fingerprint image obtained during a prior enrollment procedure, said apparatus comprising:

means for forming a two-dimensional image of a fingerprint during both enrollment and verification procedures, means for generating reference data from a fingerprint image obtained from a fingerprint during an enrollment procedure, wherein said reference data includes the two-dimensional image data and relative positioning of a plurality of reference sections of the fingerprint image, and wherein the image data contained in each of said reference sections is distinct relative to the image data adjacent to and surrounding said reference section and is redetectable by virtue of its similarity with the image data of one or more subsequent images of the fingerprint;

means for saving said reference data for later use during the verification procedure;

means for retrieving the reference data associated with an enrolled person when a person claiming to be that enrolled person seeks to be verified;

means for defining a plurality of two-dimensional verify regions in the fingerprint image of the person seeking verification, wherein each verify region corresponds in position to one of said reference sections, and wherein each verify region is larger in extent than its corresponding reference section;

means for determining a best-match location within each verify region at which the image data is most similar to the image data of its corresponding reference section; and means for verifying the identity of the person claiming to be enrolled according to the degree of similarity between the image data of said best-match locations and said corresponding reference sections, and according to the degree of similarity between the relative positioning of said best-match locations and said corresponding reference sections.

* * * * *